US012579606B2

(12) United States Patent　　　　(10) Patent No.: US 12,579,606 B2
Cragg et al.　　　　　　　　　　　　(45) Date of Patent: Mar. 17, 2026

(54) GENERATIVE AI INFERRED PROMPT OUTPAINTING

(71) Applicant: ADOBE INC., San Jose, CA (US)

(72) Inventors: Michael Spencer Cragg, Troy, MI (US); Edward Christopher Wright, Shorewood, MN (US); Davis Taylor Brown, Seattle, WA (US); Dana Michelle Jefferson, Astoria, NY (US); Andreas Kuefer, Sausalito, CA (US)

(73) Assignee: ADOBE INC., San Jose, CA (US)

( * ) Notice: Subject to any disclaimer, the term of this patent is extended or adjusted under 35 U.S.C. 154(b) by 380 days.

(21) Appl. No.: 18/167,324

(22) Filed: Feb. 10, 2023

(65) Prior Publication Data

US 2024/0273670 A1　　Aug. 15, 2024

(51) Int. Cl.
*G06K 9/00* 　　　(2022.01)
*G06T 3/40* 　　　(2006.01)
*G06T 3/608* 　　(2024.01)
*G06T 7/11* 　　　(2017.01)
*G06V 10/25* 　　(2022.01)

(52) U.S. Cl.
CPC ............... *G06T 3/40* (2013.01); *G06T 3/608* (2013.01); *G06T 7/11* (2017.01); *G06V 10/25* (2022.01); *G06T 2207/20081* (2013.01); *G06T 2207/20132* (2013.01)

(58) Field of Classification Search
CPC .. G06T 3/40; G06T 3/608; G06T 5/77; G06T 11/40; G06T 11/00; G06T 2207/20081; G06T 7/11; G06T 2207/20132; G06F 3/04845; G06N 3/08; G06N 3/096; G06V 10/25
See application file for complete search history.

(56) References Cited

U.S. PATENT DOCUMENTS

| 2013/0107284 | A1 * | 5/2013 | Hayashi | ................. | G06K 15/00 |
| | | | | | 358/1.15 |
| 2014/0240357 | A1 * | 8/2014 | Hou | ..................... | G06F 3/04845 |
| | | | | | 345/647 |
| 2016/0378788 | A1 * | 12/2016 | Panneer | ............... | G06V 10/147 |
| | | | | | 382/118 |
| 2017/0115853 | A1 * | 4/2017 | Allekotte | ................ | G06F 16/58 |
| | | | (Continued) | | |

OTHER PUBLICATIONS

Screen captures from YouTube video clip titled "DALL-E 2 Outpainting Feature—Super Simple AI Tutorial," uploaded on Oct. 19, 2022 by user "Prompt Muse". retrieved from Internet: <https://www.youtube.com/watch?v=jo--DkGakAI> (Year: 2022).*

(Continued)

*Primary Examiner* — Gregory A Morse
*Assistant Examiner* — Kevin M Coomber
(74) *Attorney, Agent, or Firm* — F. CHAU & ASSOCIATES, LLC

(57) ABSTRACT

Systems and methods for image processing are provided. Embodiments of the present disclosure obtain an image and a target dimension for expanding the image. The system generates a prompt based on the image using a prompt generation network. A diffusion model generates an expanded image based on the image, the target dimension, and the prompt, where the expanded image includes additional content in an outpainted region that is consistent with content of the image and the prompt.

20 Claims, 16 Drawing Sheets

(56) References Cited

U.S. PATENT DOCUMENTS

2024/0046422 A1* 2/2024 Song ......................... G06T 5/50

OTHER PUBLICATIONS

Screen captures from YouTube video clip titled "How To Outpaint—Stable Diffusion AI | Draw Outside the Lines," uploaded on Nov. 7, 2022 by user "Jennifer Doebelin". retrieved from Internet: <https://www.youtube.com/watch?v=60NjKM6FuyQ> (Year: 2022).*

Sabini, M., & Rusak, G. (2018). Painting outside the box: Image outpainting with gans. arXiv preprint arXiv:1808.08483. (Year: 2018).*

Weng, L. (2021). What are diffusion models?. lilianweng. github. io, 21. (Year: 2021).*

Xu, X., Wang, Z., Zhang, G., Wang, K., & Shi, H. (2023). Versatile diffusion: Text, images and variations all in one diffusion model. In Proceedings of the IEEE/CVF International Conference on Computer Vision (pp. 7754-7765). (Year: 2023).*

Xu, S. (2022). Clip-diffusion-Im: Apply diffusion model on image captioning. arXiv preprint arXiv:2210.04559. (Year: 2022).*

1Ramesh, et al., "Hierarchical Text-Conditional Image Generation with CLIP Latents", arXiv:2204.06125v1 [cs.CV] Apr. 13, 2022, 27 pages.

2Brown, et al. (2020). Language models are few-shot learners. Advances in neural information processing systems, 33, 1877-1901.

3Dall•E: Creating Images from Text, Jan. 5, 2021, https://openai.com/blog/dall-e/, 14 pages.

4Radford, et al., "Learning Transferable Visual Models From Natural Language Supervision", In Proceedings of the 38th International Conference on Machine Learning, PMLR 139, pp. 8748-8763, PMLR (Jul. 2021).

* cited by examiner

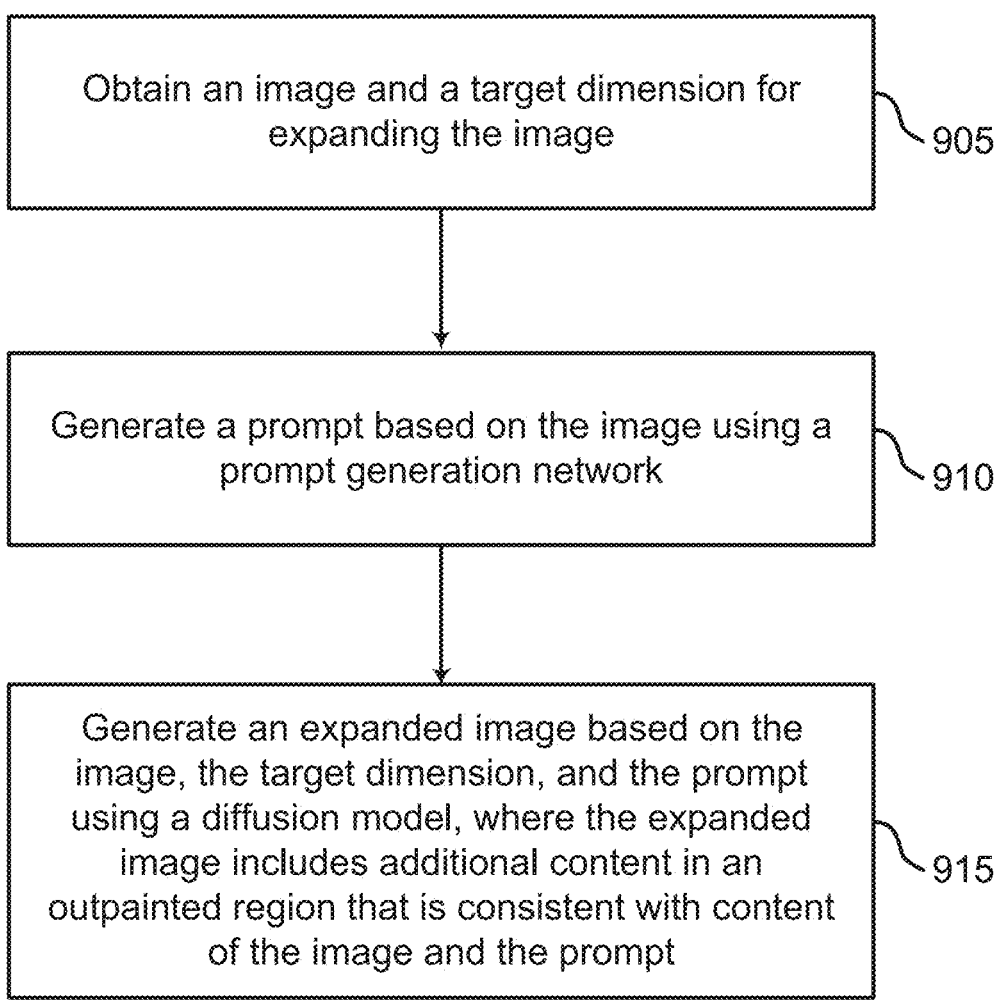

Obtain an image and a target dimension for expanding the image — 905

Generate a prompt based on the image using a prompt generation network — 910

Generate an expanded image based on the image, the target dimension, and the prompt using a diffusion model, where the expanded image includes additional content in an outpainted region that is consistent with content of the image and the prompt — 915

FIG. 9

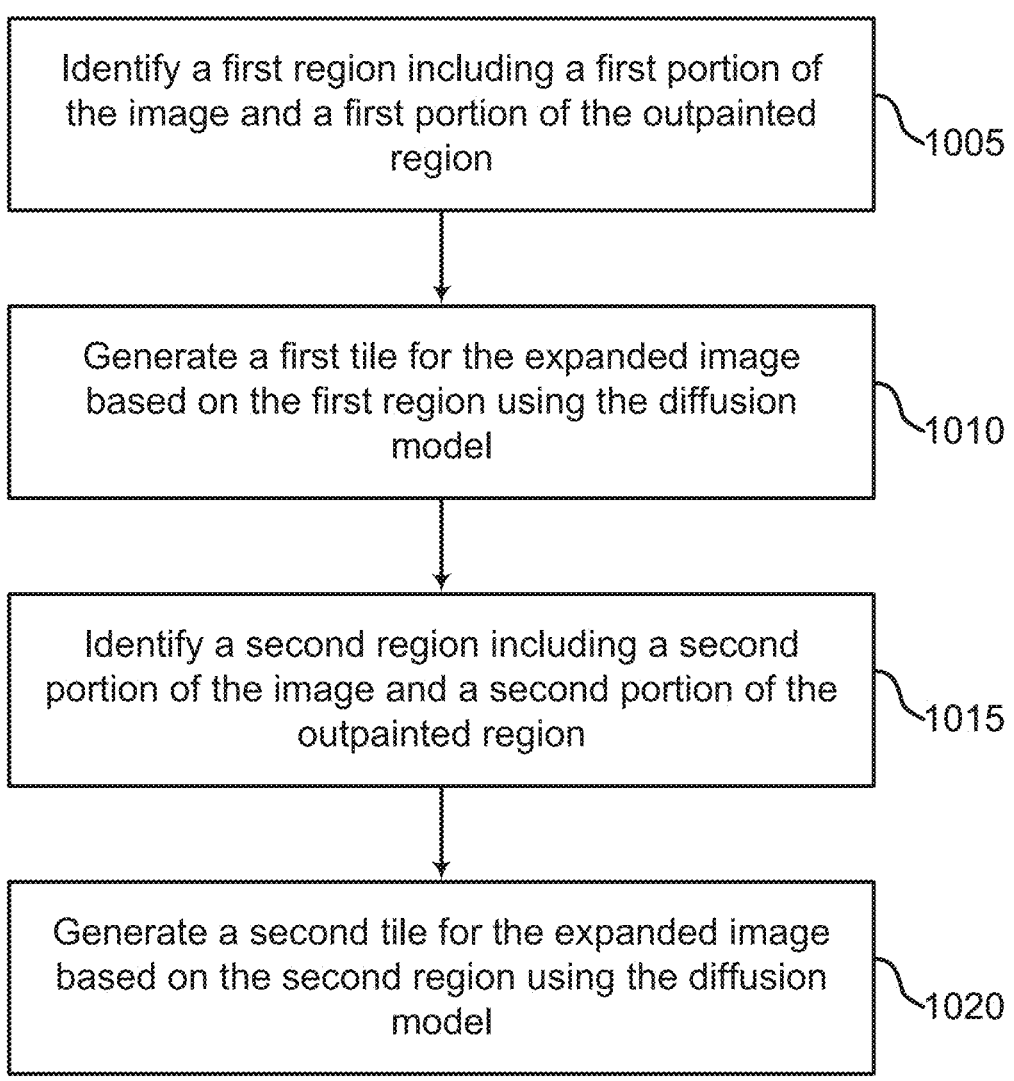

Identify a first region including a first portion of the image and a first portion of the outpainted region

1005

Generate a first tile for the expanded image based on the first region using the diffusion model

1010

Identify a second region including a second portion of the image and a second portion of the outpainted region

1015

Generate a second tile for the expanded image based on the second region using the diffusion model

Identify a skew angle corresponding to a perspective of the image — 1205

Stretch the image based on the skew angle to obtain a stretched image — 1210

Identify the outpainted region based on the stretched image and the target dimension — 1215

Initialize untrained model ⟍1405

Add noise to training image using forward diffusion process in *N* stages ⟍1410

At each stage *n*, starting with stage *N*, predict image for stage *n - 1* ⟍1415

Compare predicted image at stage *n – 1* to actual image at stage *n - 1* ⟍1420

Update parameters of the model based on the comparison ⟍1425

Initialize a diffusion model
1505

Obtain training data including an input image, a prompt, and a ground-truth expanded image
1510

Train the diffusion model to generate an expanded image that includes additional content in an outpainted region that is consistent with content of the input image and the prompt based on the training data
1515

GENERATIVE AI INFERRED PROMPT OUTPAINTING

BACKGROUND

The following relates generally to machine learning, and more specifically to machine learning for image generation. Digital image processing refers to the use of a computer to edit a digital image using an algorithm or a processing network. In some cases, image processing software can be used for various image processing tasks, such as image editing, image restoration, image generation, etc. Some image processing systems may implement machine learning techniques, for example, to perform tasks using predictive models (e.g., without explicitly programing the system for each task), to perform tasks with more accuracy or in less time, to perform tasks using special-purpose hardware, etc.

Image generation (a subfield of digital image processing) includes the use of a machine learning model to generate images. Diffusion-based models are one category of machine learning models that can be used to generate images. Specifically, diffusion models can be trained to take random noise as input and generate new images with features similar to the training data. In some examples, diffusion models can be used to generate unseen images, inpainted images (e.g., filling missing regions or masked areas within an image), or outpainted images (that add additional image parts to an original image).

SUMMARY

The present disclosure describes systems and methods for image processing. Embodiments of the disclosure include an image processing apparatus configured to receive user input and generate an expanded image using a diffusion model. In some embodiments, the user input includes an image and a target dimension for expanding the image. In some examples, an image cropping interface enables the user to increase a size of the image via an outcropping tool. The target dimension of an expanded image is larger than the dimension of the image. A prompt generation network is trained to infer a prompt based on the image and an image generation network generates an expanded image based on the prompt. For example, the prompt can be generated based on metadata (e.g., location, time, color, lighting information) associated with the image. The prompt is then fed to an image generation network (e.g., a diffusion model) to generate an expanded image that includes an outpainted region. Accordingly, users can easily expand the crop of an image to improve the image composition, change the aspect ratio, or generate new and creative variations of the same image. Embodiments of the present disclosure lead to increased quality and sharpness of the generated images.

A method, apparatus, and non-transitory computer readable medium for image processing are described. One or more embodiments of the method, apparatus, and non-transitory computer readable medium include obtaining an image and a target dimension for expanding the image; generating a prompt based on the image using a prompt generation network; and generating an expanded image based on the image, the target dimension, and the prompt using a diffusion model, wherein the expanded image includes additional content in an outpainted region that is consistent with content of the image and the prompt.

A method, apparatus, and non-transitory computer readable medium for image processing are described. One or more embodiments of the method, apparatus, and non-transitory computer readable medium include initializing a diffusion model; obtaining training data including an input image, a prompt, and a ground-truth expanded image; and training the diffusion model to generate an expanded image that includes additional content in an outpainted region that is consistent with content of the input image and the prompt based on the training data.

An apparatus and method for image processing are described. One or more embodiments of the apparatus and method include a processor; and a memory including instructions executable by the processor to: obtain an image and a target dimension for expanding the image; generate a prompt based on the image using a prompt generation network; and generate an expanded image based on the image, the target dimension, and the prompt using a diffusion model, wherein the expanded image includes additional content in an outpainted region that is consistent with content of the image and the prompt.

BRIEF DESCRIPTION OF THE DRAWINGS

FIG. 9 shows an example of a method for image processing according to aspects of the present disclosure.

FIG. 10 shows an example of a method for image processing based on one or more tiles according to aspects of the present disclosure.

DETAILED DESCRIPTION

Figure 1:
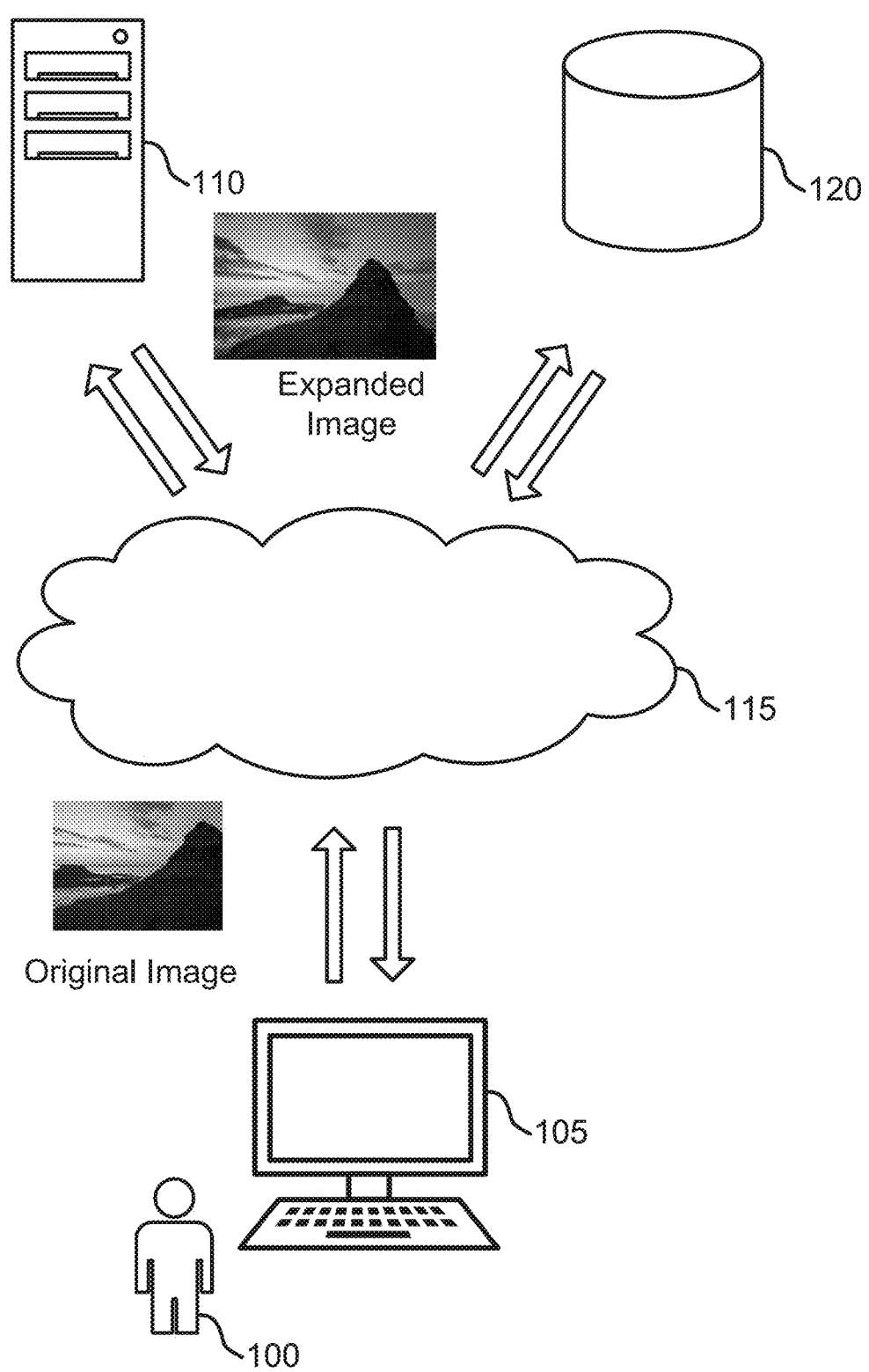
FIG. 1 shows an example of an image processing system according to aspects of the present disclosure.

The present disclosure describes systems and methods for image processing. Embodiments of the disclosure include an image processing apparatus configured to receive user input and generate an expanded image using a diffusion model. In some embodiments, the user input includes an image and a target dimension for expanding the image. In some examples, an image cropping interface enables the user to increase a size of the image via an outcropping tool. The target dimension of an expanded image is larger than the dimension of the image. A prompt generation network is trained to infer a prompt based on the image and an image generation network generates an expanded image based on the prompt. For example, the prompt can be generated based on metadata (e.g., location, time, color, lighting information) associated with the image. The prompt is then fed to an image generation network (e.g., a diffusion model) to generate an expanded image that includes an outpainted region. Accordingly, users can easily expand the crop of an image to improve the image composition, change the aspect ratio, or generate new and creative variations of the same image. Embodiments of the present disclosure lead to increased quality and sharpness of the generated images.

In some cases, users have a difficult time capturing a photo with the desired composition. For example, users may not fit objects or landscape in a photo. This is often referred to as poor framing or poor composition especially for inexperienced photographers. Poor composition at the time of capture can result in the subject being slightly off center, cut off at the edge, or having a tilted horizon line. Users have to rely on zooming and rotating on the photo to correct the composition of a photo. In some cases, parts of the image content are cropped out to correct the composition of the photo. Thus, the resulting image has decreased quality and sharpness.

Embodiments of the present disclosure include an image processing apparatus configured to infer a prompt based on an original image, wherein the prompt is further used for image generation, specifically generating an expanded image. An image cropping interface enables the user to increase a size of the image. The user indicates a target dimension for the image to be expanded, where the target dimension is larger than a dimension of the image. The expanded image includes additional content in an outpainted region that is consistent with content of the image and the prompt.

In some embodiments, the image processing apparatus includes a prompt generation network and a diffusion model for image expansion. Diffusion models are a class of generative neural networks that can be trained to generate new data with features similar to features found in training data. Diffusion models can be used in image completion tasks, such as image inpainting. Embodiments of the present disclosure apply diffusion models to image outpainting (e.g., adding additional image parts to an image to obtain an expanded image). In some examples, the diffusion model begins with a first tile of the expanded image and predicts outpainted region for the first tile such that the outpainted region includes objects that follow the context and scene of the original image. At the next iteration, the diffusion model generates outpainted region for a second tile such that outpainted region of the second tile include objects that also follow the context scene of the original image. The diffusion model repeats a similar process for one or more tiles of the expanded image.

One or more embodiments of the present disclosure can be used to adjust the geometry of an object in an image. For example, a tower object is skewed and a user wants to straighten up the tower. The image processing apparatus identifies a skew angle corresponding to a perspective of the tower object. A user, via a user interface, stretches the image based on the skew angle to obtain a stretched image. The stretched image includes an outpainted region that contains missing content due to the stretching and the outpainted region is to be completed. The image processing apparatus identifies the outpainted region based on the stretched image and the target dimension. A diffusion model then generates content for the outpainted region that is consistent with content of the image.

In some cases, "dimension" refers to a size of a digital image and/or a resolution of the image. For example, 1024×1024 represents image resolution, which is 1024 pixels in width and 1024 pixels in height. In another example, 4:3 indicates an aspect ratio of an image, which is four-inch wide and three-inch high.

Embodiments of the present disclosure can be used in the context of image editing applications. For example, an image processing apparatus based on the present disclosure receives user input via an image cropping interface including an original image and a target dimension and generates an expanded image. An example application in the image generation processing context is provided with reference to FIGS. 5-8. Details regarding the architecture of an example image processing system are provided with reference to FIGS. 1-4 and 16. Details regarding the process of image processing are provided with reference to FIGS. 9-13. Example training processes are described with reference to FIGS. 14-15.

Accordingly, by enabling prompt inference based on an image and feeding the prompt to an image generation network (e.g., a diffusion model), embodiments of the present disclosure enable users to generate content with increased accuracy and consistency for outpainted regions of an expanded image compared to conventional image editing tools. This can reduce the time it takes for users to generate the desired output, as well as guide the model to produce more relevant output. Embodiments of the present disclosure give users fine control over the target dimension of an expanded image. Embodiments of the present disclosure also enable users to easily adjust composition of photos to obtain sharp results. Prior techniques required time-consuming user intervention when editing an image. By contrast, embodiments of the present disclosure can modify image composition, change aspect ratio to a desired setting, or generate image variations based on automatically-inferred prompts. These prompts accurately capture the scene and semantics of the image and are fed to the image generation network for image outpainting.

Network Architecture

In FIGS. 1-4, an apparatus and method for image processing are described. One or more aspects of the apparatus and method include a processor; and a memory including instructions executable by the processor to: obtain an image and a target dimension for expanding the image; generate a prompt based on the image using a prompt generation network; and generate an expanded image based on the image, the target dimension, and the prompt using a diffusion model, wherein the expanded image includes additional content in an outpainted region that is consistent with content of the image and the prompt.

Some examples of the apparatus and method further include training the prompt generation network to generate the prompt. Some examples further include training the diffusion model to generate the expanded image.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 2.

As an example shown in FIG. 1, user 100 provides an image and a target dimension. The image and the target dimension are transmitted to the image processing apparatus 110, e.g., via user device 105 and cloud 115. In this example, the image includes a landscape photograph with a dimension of three inches by four inches. The resolution of the image is 1024×1024. The target dimension is 4 inches by 5 inches. That is, the dimension of the expanded image is larger than the dimension of the original image (i.e., outcropping or outpainting).

Image processing apparatus 110 infers a prompt based on metadata of the image including time information, location information, color information, or any combination thereof. Image processing apparatus 110, via an image generative model, generates an expanded image based on the image, the target dimension, and the inferred prompt. Image processing apparatus 110 generates additional content for an outpainted region. In some cases, the outpainted region is the area corresponding to a difference between the expanded image and the image. Image processing apparatus 110 identifies a sequence of tiles and generates additional content corresponding to the sequence of tiles in a particular ordering (e.g., clockwise). Alternatively, image processing apparatus 110 can also generate additional content for the tiles all at once. The expanded image is then transmitted to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application. In some examples, the image processing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Image processing apparatus 110 includes a computer implemented network comprising a machine learning model. The machine learning model includes a prompt generation network and a diffusion model. Image processing apparatus 110 also includes a processor unit, a memory unit, an image cropping interface, and a training component. The training component is used to train the machine learning model. Additionally, image processing apparatus 110 communicates with database 120 via cloud 115. In some cases, the architecture of the image processing network is also referred to as a network or a network model.

Figure 2:
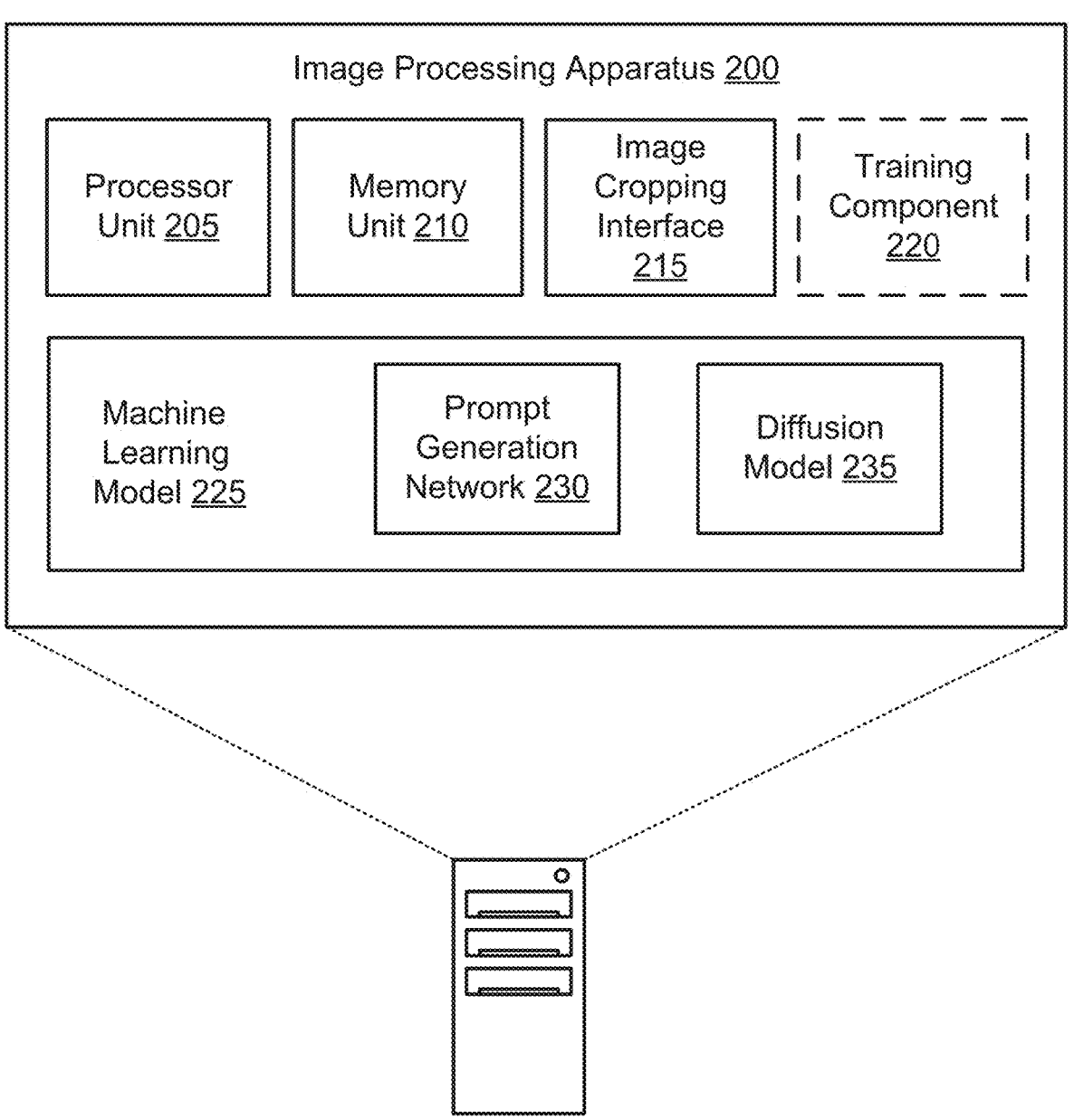
FIG. 2 shows an example of an image processing apparatus according to aspects of the present disclosure.
Figure 3:
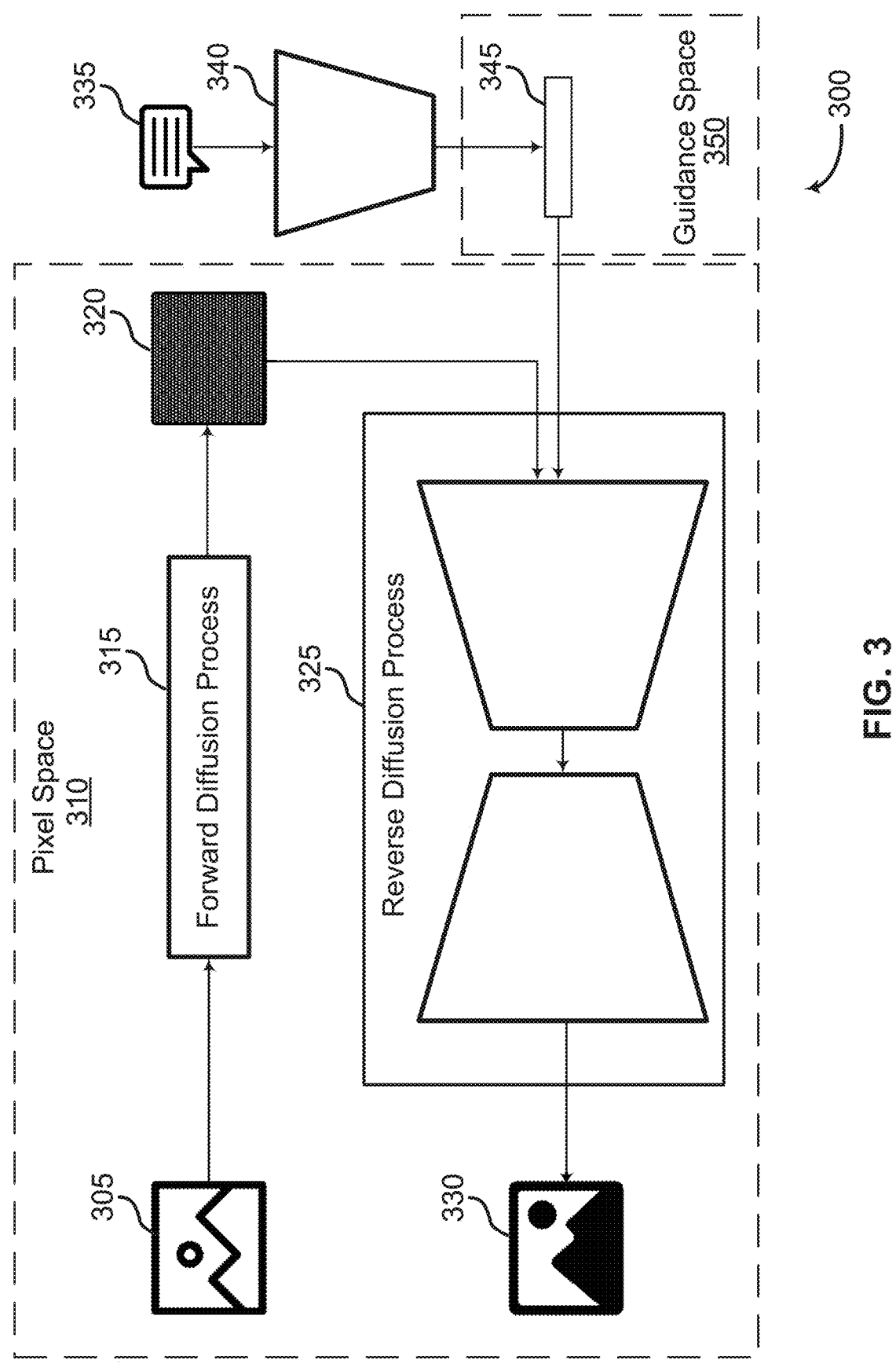
FIG. 3 shows an example of a pixel diffusion model according to aspects of the present disclosure.
Figure 4:
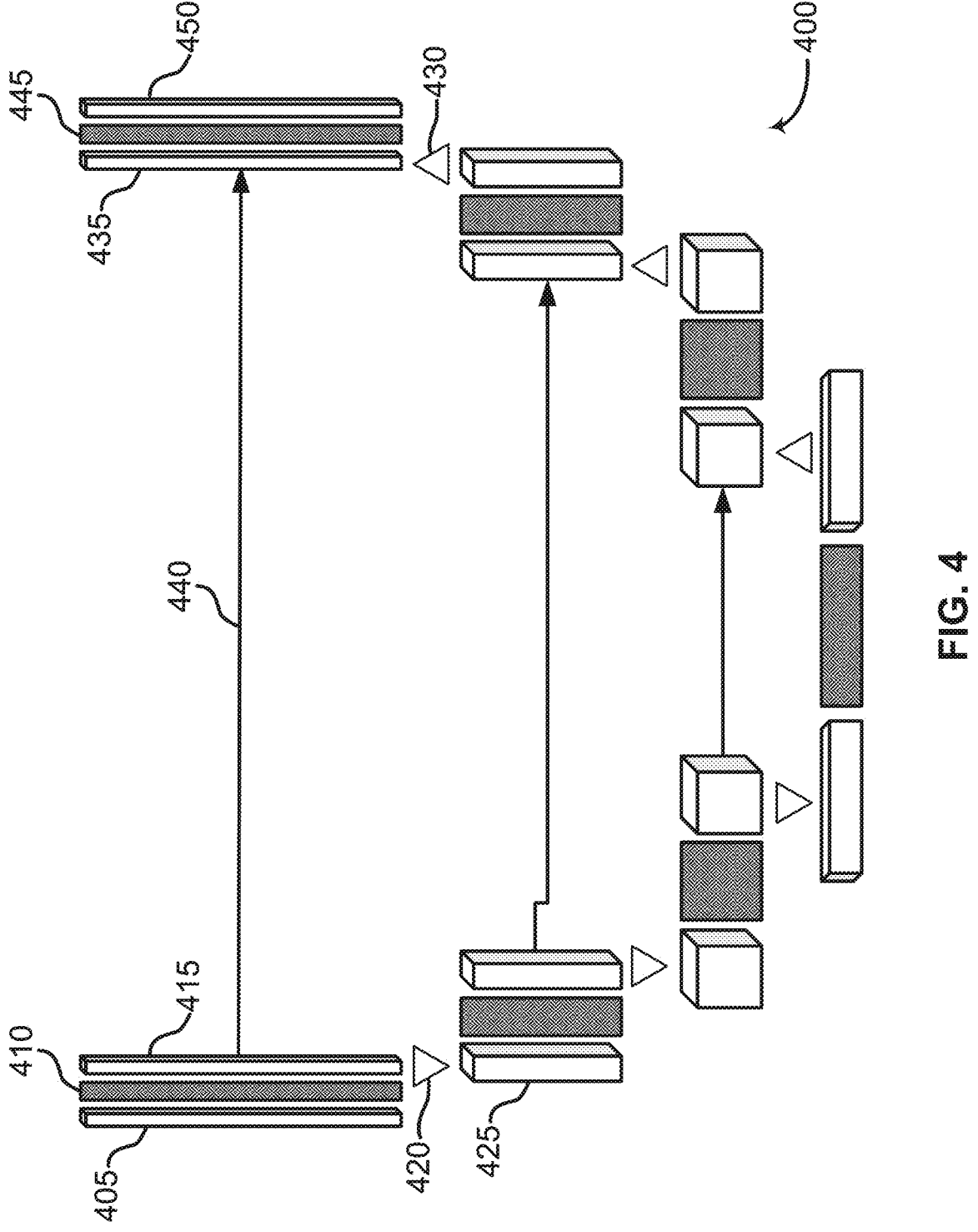
FIG. 4 shows an example of U-net architecture according to aspects of the present disclosure.

Further detail regarding the architecture of image processing apparatus 110 is provided with reference to FIGS. 2-4. Further detail regarding the application and operation of image processing apparatus 110 is provided with reference to FIGS. 8-16.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by user 100. The term "cloud" is sometimes used to describe data centers available to many users (e.g., user 100) over the Internet. Some large cloud networks have functions distributed over multiple locations from central servers. A server is designated an edge server if the server has a direct or close connection to a user (e.g., user 100). In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some embodiments, cloud 115 enables communication between user device 105, image processing apparatus 110, and database 120.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction. According to some embodiments, database 120 is external to image processing apparatus 110 and communicates with image processing apparatus 110 via cloud 115. According to some embodiments, database 120 is included in image processing apparatus 110.

FIG. 2 shows an example of an image processing apparatus according to aspects of the present disclosure. The example shown includes image processing apparatus 200, processor unit 205, memory unit 210, image cropping interface 215, training component 220, and machine learning model 225. The machine learning model 225 further includes prompt generation network 230 and diffusion model 235. Image processing apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special-purpose components for modem processing, baseband processing, digital signal processing, or transmission processing. Processor unit 205 is an example of, or includes aspects of, the processor described with reference to FIG. 16.

According to some embodiments, memory unit 210 includes instructions executable by a processor to perform certain functions. Examples of memory unit 210 include random access memory (RAM), read-only memory (ROM), or a hard disk. Examples of memory unit 210 include solid-state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state. Memory unit 210 is an example of, or includes aspects of, the memory subsystem described with reference to FIG. 16.

According to some embodiments of the present disclosure, image processing apparatus 200 includes a computer-implemented artificial neural network (ANN) to generate classification data for a set of samples. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 200 includes a computer-implemented convolutional neural network (CNN). CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, image cropping interface 215 is provided to a user, where the image cropping interface 215 enables the user to increase and decrease a size of the image. In some examples, image cropping interface 215 receives the target dimension. In some examples, image cropping interface 215 rotates the image to obtain a rotated image. In some examples, image cropping interface 215 stretches the image based on the skew angle to obtain a stretched image. Image cropping interface 215 is an example of, or includes aspects of, the corresponding element described with reference to FIG. 6.

According to some embodiments, training component 220 initializes diffusion model 235. In some examples, training component 220 obtains training data including an input image, a prompt, and a ground-truth expanded image. In some examples, training component 220 trains diffusion model 235 to generate an expanded image that includes additional content in an outpainted region that is consistent with content of the input image and the prompt based on the training data.

In some embodiments, the training data includes metadata of the input image, and where diffusion model 235 is trained to generate the expanded image based on the metadata. In some examples, training component 220 crops the ground-truth expanded image to obtain the input image. In some examples, training component 220 initializes prompt generation network 230. In some examples, training component 220 trains prompt generation network 230 to generate the prompt based on the input image. In some examples, training component 220 trains the diffusion model 235 to generate the expanded image.

According to some embodiments, training component 220 is implemented as software stored in memory and executable by a processor of the separate computing device, as firmware in the separate computing device, as one or more hardware circuits of the separate computing device, or as a combination thereof. In some examples, training component 220 is part of another apparatus other than image processing apparatus 200 and communicates with the image processing apparatus.

According to some embodiments, machine learning model 225 obtains an image and a target dimension for expanding the image. In some examples, machine learning model 225 identifies an expanded region having the target dimension, where the expanded region includes the image and the outpainted region.

In some examples, machine learning model 225 identifies the outpainted region based on the rotated image and the target dimension. In some examples, machine learning model 225 identifies a skew angle corresponding to a perspective of the image. Machine learning model 225 identifies the outpainted region based on the stretched image and the target dimension.

In some examples, machine learning model 225 generates an input map for the diffusion model 235 that includes the image in an internal region and noise in the outpainted region, where the expanded image is generated based on the input map. In some examples, machine learning model 225 generates a set of low-resolution images depicting a set of candidate dimensions for the expanded image. In some examples, machine learning model 225 receives a user input selecting one of the set of candidate dimensions as the target dimension.

In some examples, machine learning model 225 identifies a first region including a first portion of the image and a first portion of the outpainted region. In some examples, machine learning model 225 identifies a second region including a second portion of the image and a second portion of the outpainted region. According to some embodiments, machine learning model 225 obtains an image and a target dimension for expanding the image.

In an embodiment of the present disclosure, machine learning model 225 includes prompt generation network 230 and diffusion model 235. Prompt generation network 230 generates a prompt based on the image. In some examples, prompt generation network 230 identifies metadata of the image, where the prompt is generated based on the metadata. In some embodiments, the metadata includes time information, location information, color information, or a combination thereof.

In some examples, prompt generation network 230 identifies a first prompt based on the first portion of the image, where the first tile is generated based on the first prompt. In some examples, prompt generation network 230 identifies a second prompt based on the second portion of the image, where the second tile is generated based on the second prompt.

According to some embodiments, prompt generation network 230 generates the prompt based on the input image and metadata. In some embodiments, prompt generation network 230 is trained to generate the prompt based on metadata of the input image.

According to some embodiments, diffusion model 235 generates an expanded image based on the image, the target dimension, and the prompt, where the expanded image includes additional content in an outpainted region that is consistent with content of the image and the prompt. In some examples, diffusion model 235 generates a first tile for the expanded image based on the first region. In some examples, diffusion model 235 generates a second tile for the expanded image based on the second region.

According to some embodiments, diffusion model 235 performs a forward diffusion process to obtain a set of noise maps. In some examples, diffusion model 235 performs a reverse diffusion process to obtain a set of predicted noise maps, where the training is based on the set of noise maps and the set of predicted noise maps.

According to some embodiments, diffusion model 235 generates an expanded image based on the image, the target dimension, and the prompt, wherein the expanded image includes additional content in an outpainted region that is consistent with content of the image and the prompt.

FIG. 3 shows an example of a pixel diffusion model according to aspects of the present disclosure. The example shown includes guided diffusion model 300, original image 305, pixel space 310, forward diffusion process 315, noisy images 320, reverse diffusion process 325, output image 330, text prompt 335, text encoder 340, guidance features 345, and guidance space 350. Guided diffusion model 300 is an example, or includes aspects of, the diffusion model described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided diffusion model 300 may take an original image 305 in a pixel space 310 as input and apply forward diffusion process 315 to gradually add noise to the original image 305 to obtain noisy images 320 at various noise levels.

Next, a reverse diffusion process 325 (e.g., a U-Net ANN) gradually removes the noise from the noisy images 320 at the various noise levels to obtain an output image 330. In some cases, an output image 330 is created from each of the various noise levels. The output image 330 can be compared to the original image 305 to train the reverse diffusion process 325.

The reverse diffusion process 325 can also be guided based on a text prompt 335, or another guidance prompt, such as an image, a layout, a segmentation map, etc. The text prompt 335 can be encoded using a text encoder 340 (e.g., a multi-modal encoder) to obtain guidance features 345 in guidance space 350. The guidance features 345 can be combined with the noisy images 320 at one or more layers of the reverse diffusion process 325 to ensure that the output image 330 includes content described by the text prompt 335. For example, guidance features 345 can be combined with the noisy features using a cross-attention block within the reverse diffusion process 325. In some aspects, the guided diffusion model 300 includes a U-Net architecture. In some cases, the U-Net architecture is an example of, or includes aspects of, the U-Net architecture described with reference to FIG. 4.

FIG. 4 shows an example of U-Net architecture according to aspects of the present disclosure. The example shown includes U-Net 400, input features 405, initial neural network layer 410, intermediate features 415, down-sampling layer 420, down-sampled features 425, up-sampling process 430, up-sampled features 435, skip connection 440, final neural network layer 445, and output features 450. The U-Net 400 depicted in FIG. 4 is an example of, or includes aspects of, the architecture used within the reverse diffusion process described with reference to FIG. 3.

In some examples, diffusion models are based on a neural network architecture known as a U-Net 400. The U-Net 400 takes input features 405 having an initial resolution and an initial number of channels, and processes the input features 405 using an initial neural network layer 410 (e.g., a convolutional network layer) to produce intermediate features 415. The intermediate features 415 are then down-sampled using a down-sampling layer 420 such that down-sampled features 425 features have a resolution less than the initial resolution and a number of channels greater than the initial number of channels.

This process is repeated multiple times, and then the process is reversed. For example, the down-sampled features 425 are up-sampled using up-sampling process 430 to obtain up-sampled features 435. The up-sampled features 435 can be combined with intermediate features 415 having a same resolution and number of channels via a skip connection 440. These inputs are processed using a final neural network layer 545 to produce output features 450. In some cases, the output features 450 have the same resolution as the initial resolution and the same number of channels as the initial number of channels.

In some cases, U-Net 400 takes additional input features to produce conditionally generated output. For example, the additional input features could include a vector representation of an input prompt. The additional input features can be combined with the intermediate features 415 within the neural network at one or more layers. For example, a cross-attention module can be used to combine the additional input features and the intermediate features 415.

Image Outpainting

In FIGS. 5-13, a method, apparatus, and non-transitory computer readable medium for image processing are described. One or more aspects of the method, apparatus, and non-transitory computer readable medium include obtaining an image and a target dimension for expanding the image; generating a prompt based on the image using a prompt generation network; and generating an expanded image based on the image, the target dimension, and the prompt using a diffusion model, wherein the expanded image includes additional content in an outpainted region that is consistent with content of the image and the prompt.

Some examples of the method, apparatus, and non-transitory computer readable medium further include providing an image cropping interface to a user, wherein the image cropping interface enables the user to increase and decrease a size of the image. Some examples further include receiving the target dimension via the image cropping interface.

Some examples of the method, apparatus, and non-transitory computer readable medium further include identifying an expanded region having the target dimension, wherein the expanded region includes the image and the outpainted region.

Some examples of the method, apparatus, and non-transitory computer readable medium further include rotating the image to obtain a rotated image. Some examples further include identifying the outpainted region based on the rotated image and the target dimension.

Some examples of the method, apparatus, and non-transitory computer readable medium further include identifying a skew angle corresponding to a perspective of the image. Some examples further include stretching the image based on the skew angle to obtain a stretched image. Some examples further include identifying the outpainted region based on the stretched image and the target dimension.

Some examples of the method, apparatus, and non-transitory computer readable medium further include identifying metadata of the image, wherein the prompt is generated based on the metadata. In some embodiments, the metadata comprises time information, location information, color information, or a combination thereof.

Some examples of the method, apparatus, and non-transitory computer readable medium further include generating an input map for the diffusion model that includes the image in an internal region and noise in the outpainted region, wherein the expanded image is generated based on the input map.

Some examples of the method, apparatus, and non-transitory computer readable medium further include generating a plurality of low-resolution images depicting a plurality of candidate dimensions for the expanded image. Some examples further include receiving a user input selecting one of the plurality of candidate dimensions as the target dimension.

Some examples of the method, apparatus, and non-transitory computer readable medium further include identifying a first region including a first portion of the image and a first portion of the outpainted region. Some examples further include generating a first tile for the expanded image based on the first region using the diffusion model. Some examples further include identifying a second region including a second portion of the image and a second portion of the outpainted region. Some examples further include generating a second tile for the expanded image based on the second region using the diffusion model.

Some examples of the method, apparatus, and non-transitory computer readable medium further include identifying a first prompt based on the first portion of the image, wherein the first tile is generated based on the first prompt. Some examples further include identifying a second prompt based on the second portion of the image, wherein the second tile is generated based on the second prompt.

Figure 5:
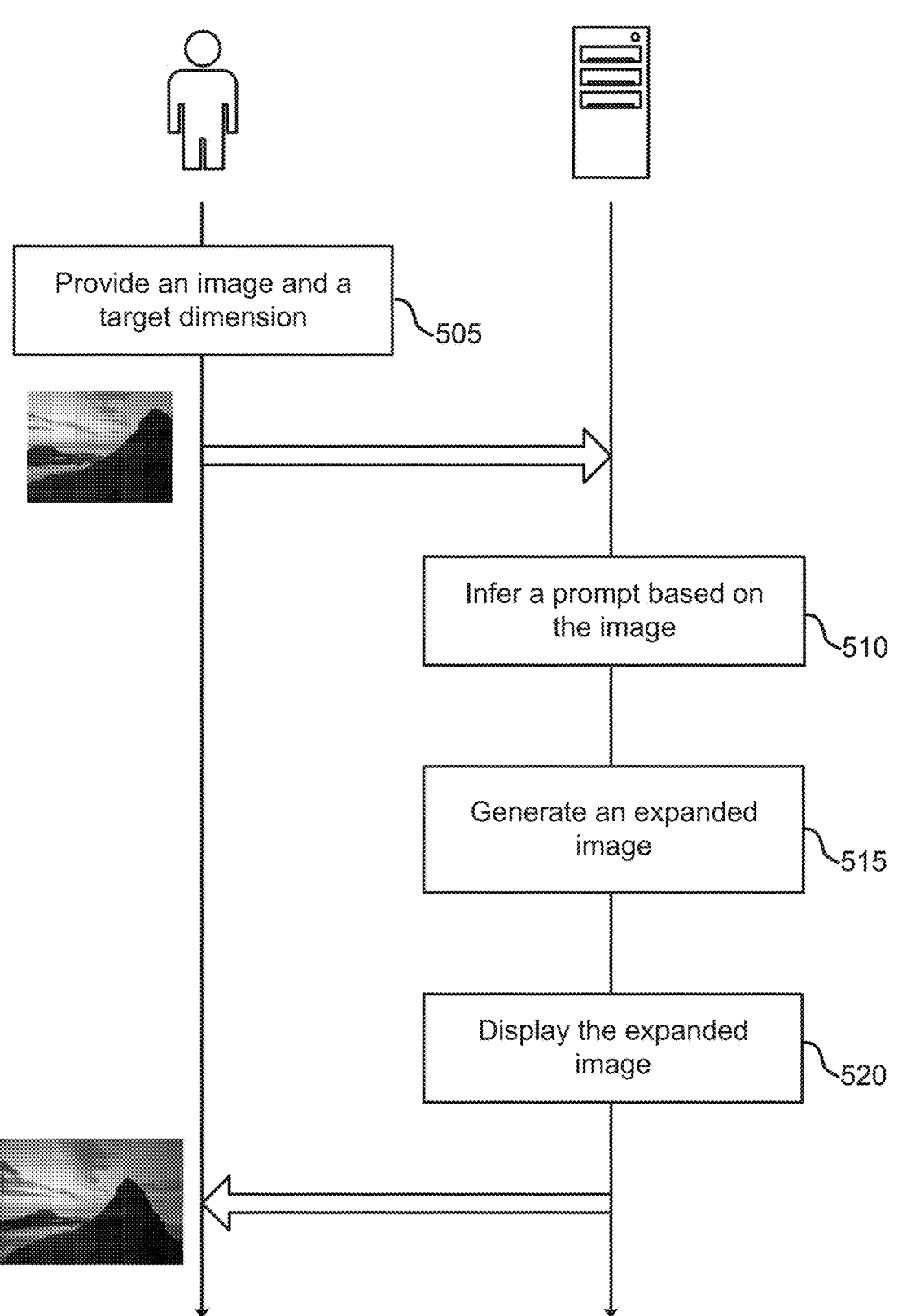
FIG. 5 shows an example of image expansion according to aspects of the present disclosure.

FIG. 5 shows an example of image expansion according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, a user (e.g., a photographer) provides an image and a target dimension to an image processing apparatus. In some cases, the image processing apparatus is implemented on a user interface. The user first selects an outcrop tool provided in the user interface to indicate the target dimension of the image (i.e., desired dimension for an output image). For example, the user indicates the target dimension of the expanded image, where the target dimension is larger than an original dimension of the image. In some cases, the user may decrease target dimension of the image. As used herein, the term "dimension" refers to the height, width, and a number of pixels per inch of an image.

The image processing apparatus generates an expanded image in response to the input (e.g., the image and the target dimension) and displays the expanded image to the user. The expanded image includes new pixels that are generated by the image processing apparatus in an outpainted region. The outpainted region is a region of difference between the image (e.g., input image) and the target dimension. The content of the pixels of the expanded image that corresponds to the outpainted region is generated by the image processing apparatus based on an inferred prompt. According to some embodiments, the image processing apparatus automatically infers the prompt based on the metadata of the image. In some cases, a user can manually insert the prompt to the image processing apparatus to generate new pixels in one or more outpainted regions.

At operation 505, the user provides an image and a target dimension for expanding the image. In some cases, the operations of this step refer to, or may be performed by, a user as described with reference to FIG. 1. In some cases, the target dimension is larger than the original dimension of the image.

In some cases, the target dimension may be smaller than the original dimension of the image. For example, when applying the image processing apparatus to geometry modification of an image, a user may adjust an object or manipulate geometry related to the image. Therefore, the target dimension of the image is reduced and is smaller than the original dimension of the image. Further detail regarding geometry modification is described with reference to FIGS. 12 and 13.

At operation 510, the system infers a prompt based on the image. In some cases, the operations of this step refer to, or may be performed by, an image processing apparatus as described with reference to FIGS. 1 and 2. According to some embodiments, the image processing apparatus infers the prompt based on the metadata of the image. For example, the metadata of the image includes time information, location information, color information, or a combination thereof An example of time information is the time of the day (e.g., 5:35 PM) or a phrase indicating the time of a day (e.g., "sunset"). An example of location information is GPS location information (e.g., San Francisco or Latitude: 37.773972 and Longitude: −122.431297). The term "GPS" is global positioning system that shows location information of a user.

At operation 515, the system generates an expanded image based on the image, the inferred prompt, and the target dimension. In some cases, the operations of this step refer to, or may be performed by, an image processing apparatus as described with reference to FIGS. 1 and 2. According to some embodiments, the image processing apparatus generates new pixels in an outpainted region based on the inferred prompt in the outpainted region. In some cases, the image processing apparatus generates new pixels at the tiling steps or process. For example, the image processing apparatus generates new pixels in an outpainted region in a right bottom corner of the expanded image. Then, the image processing apparatus generates new pixels in the outpainted region in a left bottom corner of the expanded image and continues in a clockwise direction.

Alternatively, the image processing apparatus generates new pixels in an outpainted region in a right upper corner of the expanded image and continues in a counter-clockwise direction. In each of the tiling steps, the image processing apparatus generates new pixels based on metadata of the image. Detail regarding tiling steps is further described with reference to FIGS. 10 and 11.

At operation 520, the system displays the expanded image to the user. In some cases, the operations of this step refer to, or may be performed by, an image processing apparatus as described with reference to FIGS. 1 and 2. According to some embodiments, the image processing apparatus displays the expanded image via an image cropping interface. The image cropping interface includes one or more interface elements such as low-resolution images representing a variety of expanded images. These expanded images may differ in terms of style, color, dimension, etc., and are shown to the user for selection.

Figure 6:
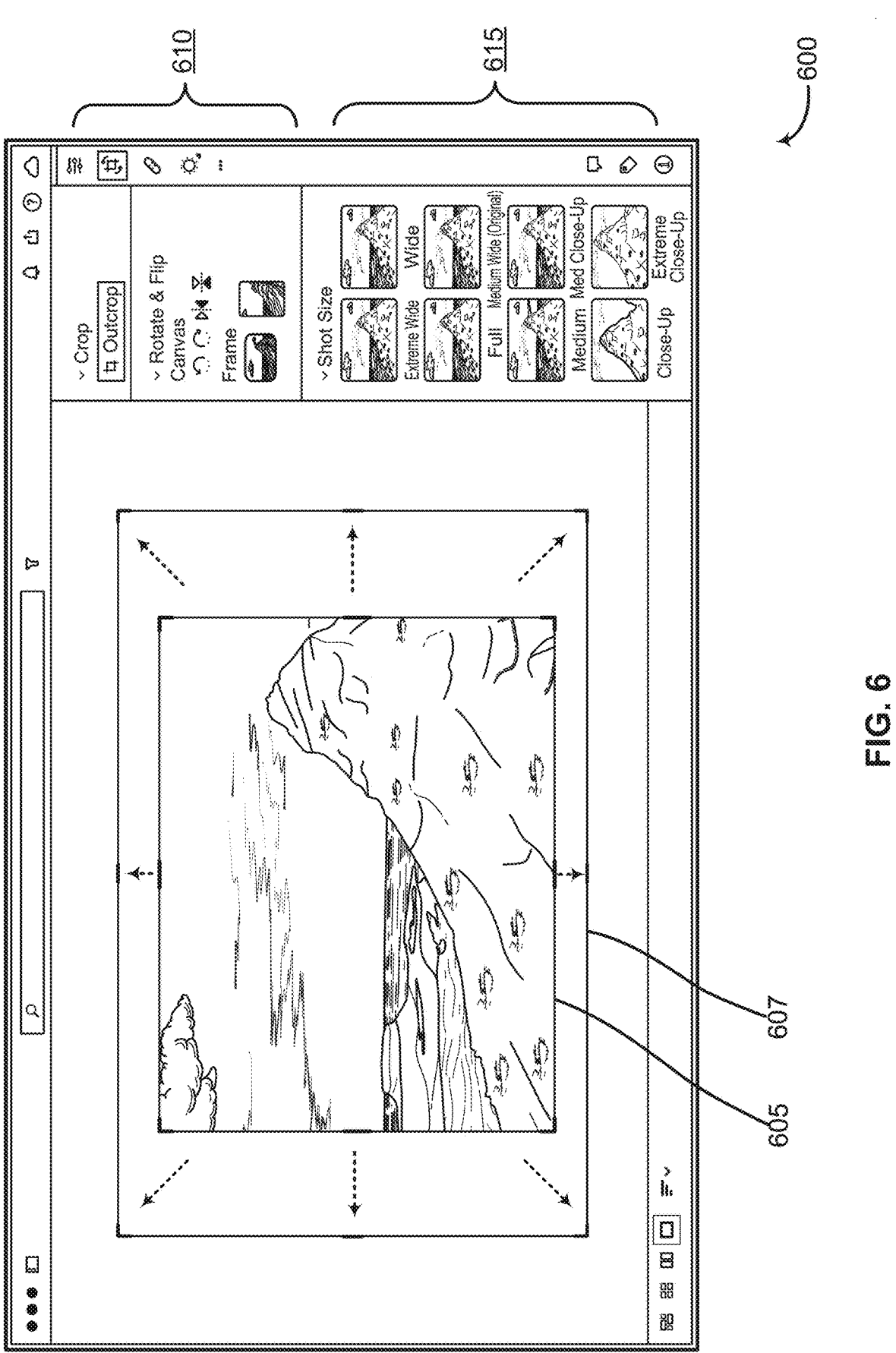
FIG. 6 shows an example of an image cropping interface according to aspects of the present disclosure.

FIG. 6 shows an example of an image cropping interface according to aspects of the present disclosure. The example shown includes image cropping interface 600, image 605, expanded image 607, interface element(s) 610, and low-resolution image(s) 615.

Referring to FIG. 6, a user uploads image 605 to image cropping interface 600. The image cropping interface 600 identifies the dimension of image 605. In some cases, the image cropping interface 600 displays a selection box indicating the dimension of image 605. Alternatively, the user selects outcrop tool in interface element 610 to generate the selection box. The user may expand the selection box in any direction to indicate a target dimension for image 605 (i.e., an enlarged dimension for expanded image 607). In some cases, the target dimension is larger than the dimension of image 605. In some cases, the target dimension is smaller than the dimension of image 605 (e.g., when applying geometry modification as described with reference to FIGS. 12 and 13). In some cases, the outcrop tool from interface elements 610 selects outpainted regions based on image 605 to obtain expanded image 607.

Prior to selecting a target dimension for image 605, the image processing apparatus, via image cropping interface 600, generates a set of low-resolution images 615 depicting candidate dimensions for expanded image 607. These low-resolution images 615 are listed under the shot size. Low-resolution images 615 vary in size and resolution. A user may select a candidate low-resolution image to indicate a target dimension for expanded image 607. The set of low-resolution images 615 depict candidate dimensions for expanded image 607.

In some examples, interface element(s) 610 includes at least a crop element (e.g., an outcrop box), a rotate element, and a flip element. A user, via the rotate element, rotates image 605 to obtain a rotated image. The outpainted region is identified based on the rotated image and the target dimension.

Image cropping interface 600 is an example of, or includes aspects of, the corresponding element described with reference to FIG. 2. Image 605 is an example of, or includes aspects of, the corresponding element described with reference to FIGS. 7, 11, and 13. Expanded image 607 is an example of, or includes aspects of, the corresponding element described with reference to FIGS. 7 and 8. Interface element 610 is an example of, or includes aspects of, the corresponding element described with reference to FIGS. 8 and 13.

Figure 7:
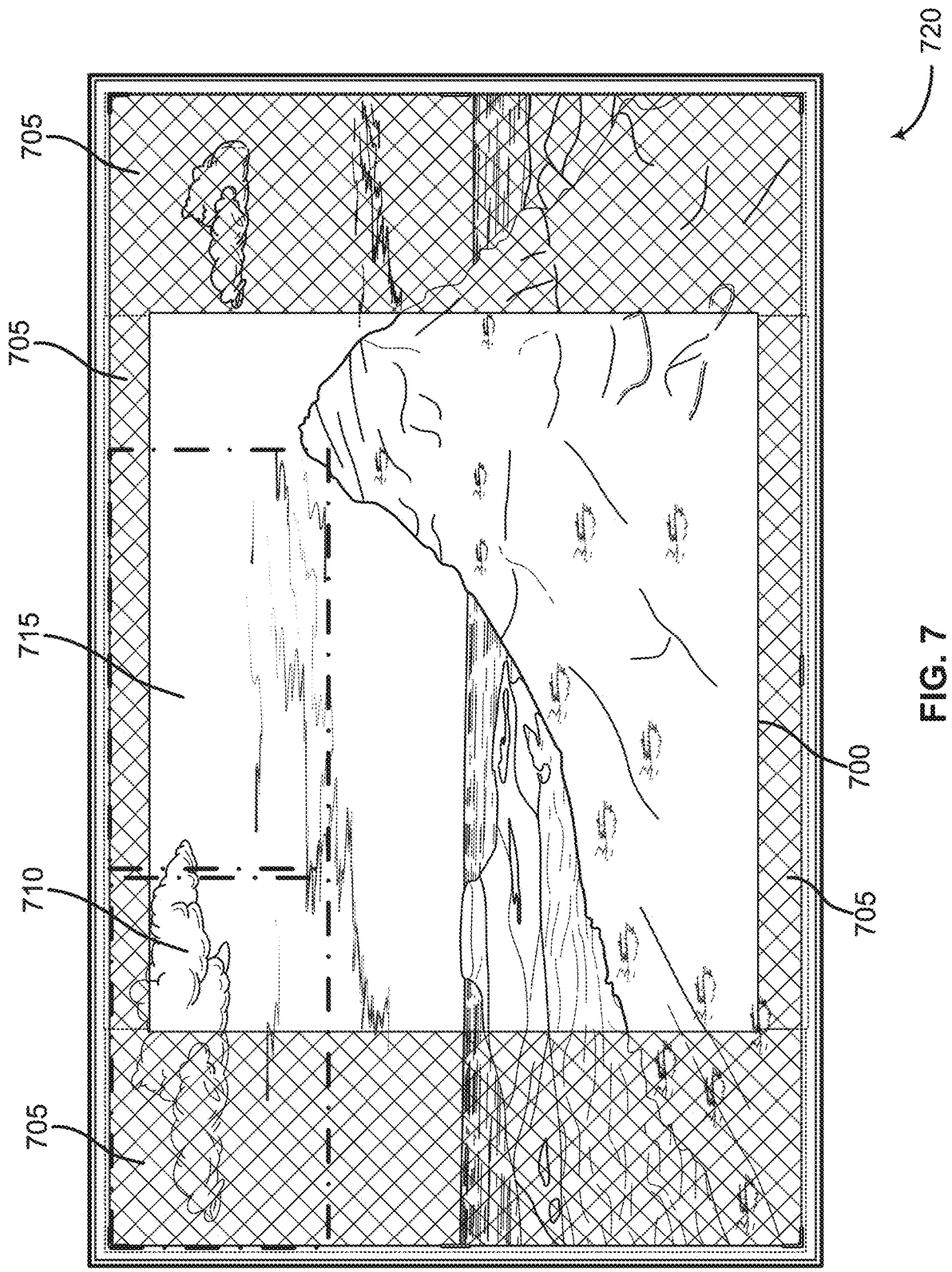
FIG. 7 shows an example of image generation according to aspects of the present disclosure.

FIG. 7 shows an example of image generation according to aspects of the present disclosure. The example shown includes image 700, outpainted region(s) 705, first tile 710, second tile 715, and expanded image 720.

Referring to an example illustrated in FIG. 7, a user indicates a target dimension of expanded image 720 via an outcrop tool of the image cropping interface. The user expands the image 700 to obtain a desired output image (i.e., expanded image 720). In some cases, the dimension of image 700 is indicated by the borderlines and four corners of image 700. The prompt generation network 230, as described with reference to FIG. 2, infers one or more prompts based on image 700. Then, diffusion model 235 generates new pixels in outpainted region 705 based on the inferred prompt. Outpainted region 705 is a region between the natural border of image 700 and target dimension of the image. In this example, outpainted region 705 is located at the top, bottom, left, and right side adjacent to image 700. In this example, outpainted region 705 is represented using checker board pattern filling (i.e., blurry areas). First tile 710 and second tile 715 are marked or circled using a dash-dot box.

According to some embodiments of the present disclosure, the new pixels are generated in one or more tiles inside outpainted region 705. For example, first tile 710 includes a first portion of image 700 and a first portion of outpainted region 705. First tile 710 is represented using the dash-dot line pattern. The first portion of image 700 is an overlapping region between image 700 and first tile 710 (e.g., located in the upper left corner). The first portion of outpainted region 705 is an overlapping region between first tile 710 and outpainted region 705 (e.g., located in the upper left corner).

First tile 710 and second tile 715 are not limited to a rectangular shape. In some cases, first tile 710 and second tile 715 may be represented in triangular shape, circular shape, polygonal shape, or any combination thereof.

The image processing apparatus 200 (as shown in FIG. 2) infers one or more prompts based on the first portion of the image 700. The image processing apparatus 200 generates new pixels in the first portion of outpainted region 705 based on the inferred prompt. In some embodiments, diffusion model 235 generates additional content in outpainted region 705 that is consistent with the content of image 700 and the inferred prompt.

Diffusion model 235 generates second tile 715. Second tile 715 includes a second portion of image 700 and a second portion of outpainted region 705 in the upper middle region of expanded image 720 (i.e., upper middle region above and adjacent to image 700). In some embodiments, second tile 715 includes a portion of the generated pixel in the first portion of the outpainted region 705. The image processing apparatus 200 generates a sequence of tiles for expanded image 720 and new pixels (or additional content) corresponding to the sequence of tiles.

Image 700 is an example of, or includes aspects of, the corresponding element described with reference to FIGS. 6, 11, and 13. Outpainted region 705 is an example of, or includes aspects of, the corresponding element described with reference to FIG. 13. First tile 710 is an example of, or includes aspects of, the corresponding element described with reference to FIGS. 8 and 11. Second tile 715 is an example of, or includes aspects of, the corresponding element described with reference to FIGS. 8 and 11. Expanded image 720 is an example of, or includes aspects of, the corresponding element described with reference to FIGS. 6 and 8.

Figure 8:
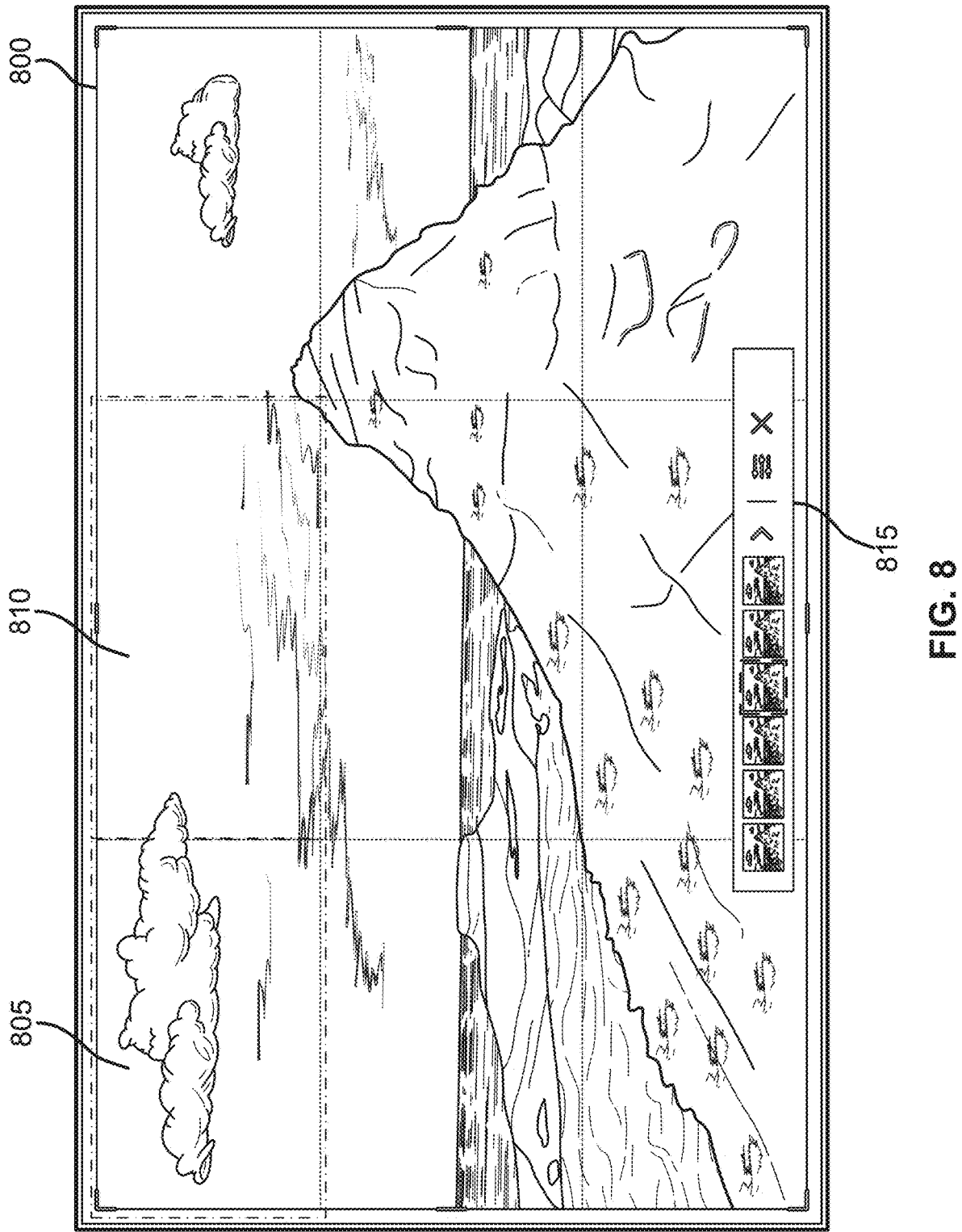
FIG. 8 shows an example of an expanded image according to aspects of the present disclosure.

FIG. 8 shows an example of an expanded image 800 according to aspects of the present disclosure. The example shown includes expanded image 800, first tile 805, second tile 810, and interface element(s) 815. Referring to FIG. 8, the image processing apparatus generates expanded image 800. According to some embodiments, expanded image 800 includes first tile 805 and second tile 810. First tile 805 includes a first portion of an image (e.g., an input image) and a first portion of an outpainted region (as described in FIG. 7), where new pixels are generated in the outpainted region. In some cases, the outpainted region includes additional content in the outpainted region that is consistent with the content of the image and the prompt.

According to some embodiments of the present disclosure, the image processing apparatus expands the dimension of expanded image 800 to obtain an additional expanded image. The additional expanded image includes an additional outpainted region, where new content are generated in the additional outpainted region based on outpainted image 800, the target dimension, and an additional inferred prompt. In some cases, prompt generation network 230, as described in FIG. 2, generates the additional prompt based on expanded image 800 (or at least based on the original image provided by a user). Accordingly, the image processing apparatus can expand the target dimension of expanded image 800 multiple times, if desired.

According to an embodiment, a user expands the dimension of the input image to improve the image composition, change orientation and ratio of the output image, or explore new variations of image parts in the expanded region. The outcropping process can be performed on expanded image 800 by expanding or outpainting expanded image 800 to generate additional content in the additional expanded region or explore more variations of image parts in the additional expanded region.

According to some embodiments, the image cropping interface includes interface element(s) 815. Interface element 815 shows a set of candidate expanded image 800 (i.e., low resolution images or thumbnails) that may be different in terms of style, size, shading effect, color, etc. For example, a user selects a thumbnail from the set of candidate expanded images via interface element 815 to obtain expanded image 800.

Expanded image 800 is an example of, or includes aspects of, the corresponding element described with reference to FIGS. 6, 7, 11 and 13. First tile 805 is an example of, or includes aspects of, the corresponding element described with reference to FIGS. 7 and 11. Second tile 810 is an example of, or includes aspects of, the corresponding element described with reference to FIGS. 7 and 11. Interface element 815 is an example of, or includes aspects of, the corresponding element described with reference to FIGS. 6 and 13.

FIG. 9 shows an example of a method for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system obtains an image and a target dimension for expanding the image. In some cases, the operations of this step refer to, or may be performed by, a machine learning model as described with reference to FIG. 2. In some cases, the machine learning model identifies the target dimension of the image via an image cropping interface. The machine learning model enables the user to crop beyond the bounds of an image (i.e., to obtain an expanded image with the target dimension. The target dimension is larger than an original dimension of the image.

At operation 910, the system generates a prompt based on the image using a prompt generation network. In some cases, the operations of this step refer to, or may be performed by, a prompt generation network as described with reference to FIG. 2.

According to some embodiments, a prompt generation network is a pre-trained neural work that can infer a prompt based on metadata of the image. For example, image metadata includes, but not limited to, time information, location information, color information, or any combination thereof. An example of time information is the time of a day (e.g., 5:35 PM) or a phrase suggesting the time of a day (e.g., "sunset"). An example of location information is from GPS (e.g., San Francisco or Latitude: 37.773972 and Longitude: −122.431297). Additionally or alternatively, the inferred prompt is generated based on available metadata of the image, for example, GPS, time of day, location, author, keyword data, and camera settings (brand, model, lens, shutter speed, ISO, etc.). The term "ISO" refers to the sensitivity of the camera's sensor to light. The inferred prompt is input to a generative model (e.g., diffusion model).

At operation 915, the system generates an expanded image based on the image, the target dimension, and the prompt using a diffusion model, where the expanded image includes additional content in an outpainted region that is consistent with content of the image and the prompt. In some cases, the operations of this step refer to, or may be performed by, a diffusion model as described with reference to FIG. 2.

According to some embodiments of the present disclosure, the diffusion model generates unique, contextual, and personalized variations of image parts in the expanded region illustrating how the image looks beyond the original bounds of the input image. The diffusion model generates new pixels in an outpainted region based on the inferred prompt. In some cases, the diffusion model generates new pixels in tiling steps. Further detail regarding tiling steps is described with reference to FIGS. 10 and 11.

FIG. 10 shows an example of a method for image processing based on one or more tiles according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system identifies a first region including a first portion of the image and a first portion of the outpainted region. In some cases, the operations of this step refer to, or may be performed by, a machine learning model as described with reference to FIG. 2. Referring to an example shown in FIG. 11, the machine learning model identifies a first region including a first portion of the image (e.g., right bottom corner of the image) and a first portion of the outpainted region (e.g., the right bottom corner of the expanded image in a mirrored "L" shape). The first portion of the image and the first portion of the outpainted region are adjacent to each other, where the additional content (or new pixels) in the first portion of the outpainted region is consistent with the first portion of the image.

At operation 1010, the system generates a first tile for the expanded image based on the first region using the diffusion model. In some cases, the operations of this step refer to, or may be performed by, a diffusion model as described with reference to FIG. 2. In some cases, first tile is an example of, or includes aspect of, the corresponding element as described with reference to FIGS. 7, 8, and 11. In an example shown in FIG. 11, a first tile is located at the right bottom of the expanded image and is of a rectangular shape.

At operation 1015, the system identifies a second region including a second portion of the image and a second portion of the outpainted region. In some cases, the operations of this step refer to, or may be performed by, a machine learning model as described with reference to FIG. 2. In the above example, the machine learning model identifies the second region that is adjacent to the first region (e.g., second region at a region adjacent to the bottom right corner). The second region includes a second portion of the image (e.g., left bottom corner of the image) and a second portion of the outpainted region (e.g., the left bottom corner of the expanded image in a "L" shape). In some cases, the second region may be spaced apart from the first region.

At operation 1020, the system generates a second tile for the expanded image based on the second region using the diffusion model. In some cases, the operations of this step refer to, or may be performed by, a diffusion model as described with reference to FIG. 2. In some cases, second tile is an example of, or includes aspect of, the corresponding element as described with reference to FIGS. 7, 8, and 11. In an example shown in FIG. 11, a second tile is located at the left bottom of the expanded image and is of a rectangular shape.

Figure 11:
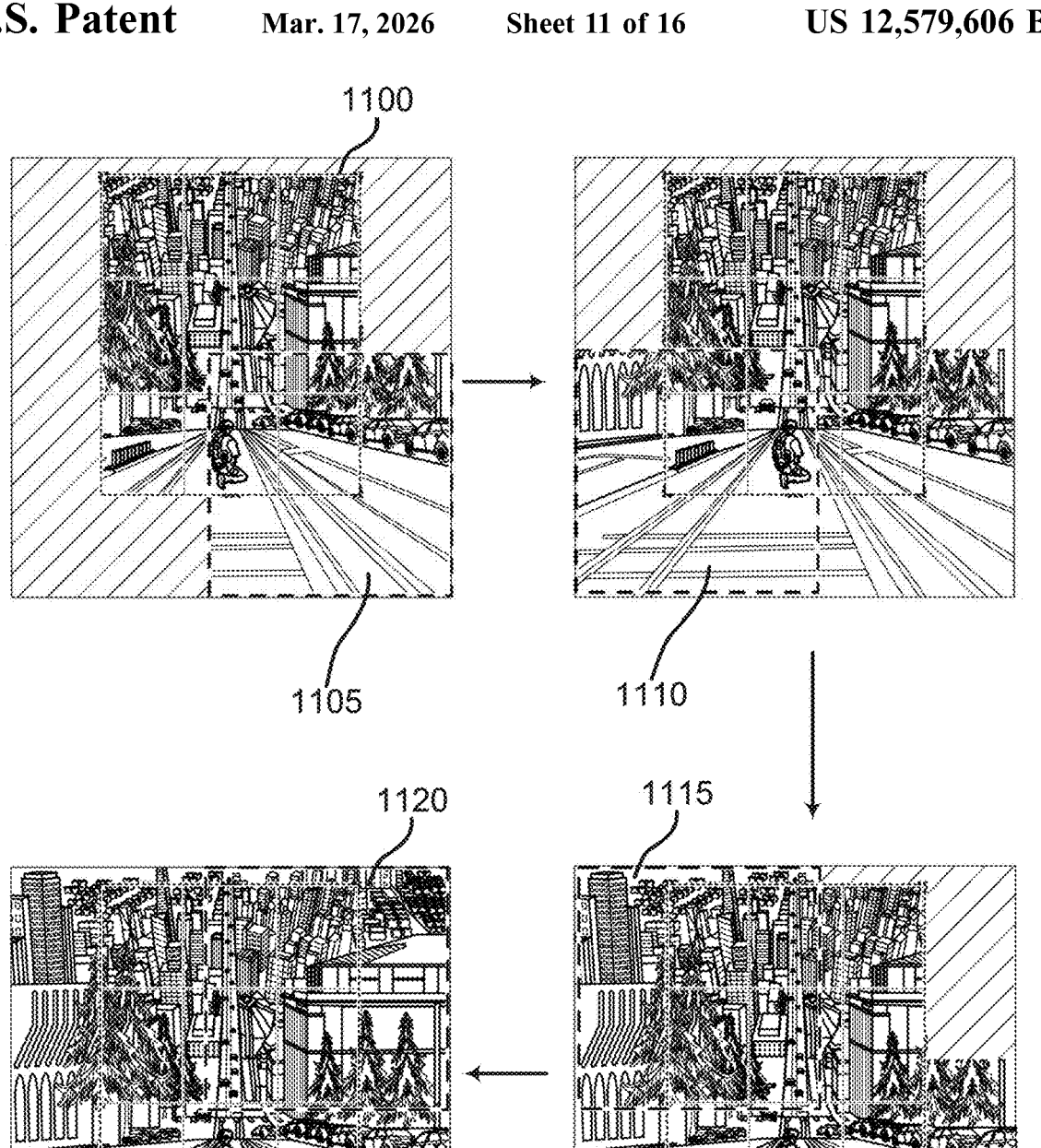
FIG. 11 shows an example of image processing based on one or more tiles according to aspects of the present disclosure.

FIG. 11 shows an example of image processing based on one or more tiles according to aspects of the present disclosure. The example shown includes image 1100, first tile 1105, second tile 1110, third tile 1115, fourth tile 1120, and expanded image 1125. In some examples, image 1100 is provided by a user and may also be referred to as an input image or original image. Referring to FIG. 11, the image processing apparatus generates first tile 1105 located at the bottom right corner, where first tile overlaps in part over image 1100. First tile 1105 includes a first portion of image 1100 and a first portion of the outpainted region. Here, the outpainted region is represented using upward diagonal pattern fill. Borderline of first tile 1105 is represented using dash line. Similarly, borderlines of second tile 1110, third tile 1115, and fourth tile 1120 are represented using dash line.

According to an embodiment, the image processing apparatus infers a prompt based on the portion of image 1100 and generates new pixels (additional content) for the portion of the outpainted region corresponding to first tile 1105 based on the prompt. As an example, image 1100 depicts a person taking a picture of a cityscape in San Francisco. A prompt is inferred based on image 1100 with a neural network trained on a variety of (image, text) pairs such as CLIP. The prompt is "a person taking a picture of a cityscape, award winning photo, optical illusion, anamorphic widescreen, photograph of San Francisco, built on a steep hill, detailed." In this example, metadata associated with image 1100 is "Location: San Francisco; Time of day: Sunset; Camera settings: Sony a7 105 mm f4; and Author: Joseph".

The image processing apparatus generates second tile 1110 located at the bottom left corner, where second tile 1110 overlaps in part over image 1100. Second tile 1110 includes a second portion of image 1100 and a second portion of the outpainted region. Second tile 1110 is adjacent to first tile 1105. In some cases, second tile 1110 may partially overlap first tile 1105. As second tile 1110 partially overlaps first tile 1105, the image processing apparatus infers a prompt based on a first portion of image 1100 in first tile 1105 and a second portion of image 1100 in second tile 1110.

The image processing apparatus generates third tile 1115 located at the upper left corner, where third tile 1115 overlaps in part over image 1100. The image processing apparatus generates fourth tile 1120 located at the upper right corner, where fourth tile 1120 overlaps in part over image 1100. There may be additional tiles (i.e., not limited to four tiles) dependent on a target dimension of expanded image 1125. Diffusion model 235 generates expanded image 1125 by predicting additional content in one or more tiles based on image 1100 and the inferred prompt.

According to some embodiments, the resolution of image 1100 (i.e., original image size) is used during outcropping process to calculate a number of sequential tiling steps to generate additional content (e.g., the image parts of the expanded region). As an example shown in FIG. 11, first tile 1105 has a resolution of 1024×1024. Second tile 1110 has a resolution of 1024×1024. The same resolution is set for third tile 1115 and fourth tile 1120. In some cases, the image processing apparatus generates a set of sequential regions (and tiles) in a clockwise direction. In some cases, the image processing apparatus identifies a set of sequential regions in a counterclockwise direction.

According to an embodiment, the image processing apparatus expands the crop of image 1100 to improve the image composition, change the format, or create additional variations. The generative process can be rerun again by expanding the crop further to generate more content or interpret more variations.

Image 1100 is an example of, or includes aspects of, the corresponding element described with reference to FIGS. 6, 7, and 13. First tile 1105 is an example of, or includes aspects of, the corresponding element described with reference to FIGS. 7 and 8. Second tile 1110 is an example of, or includes aspects of, the corresponding element described with reference to FIGS. 7 and 8. Expanded image 1125 is an example of, or includes aspects of, the corresponding element described with reference to FIGS. 8 and 13.

Figure 12:
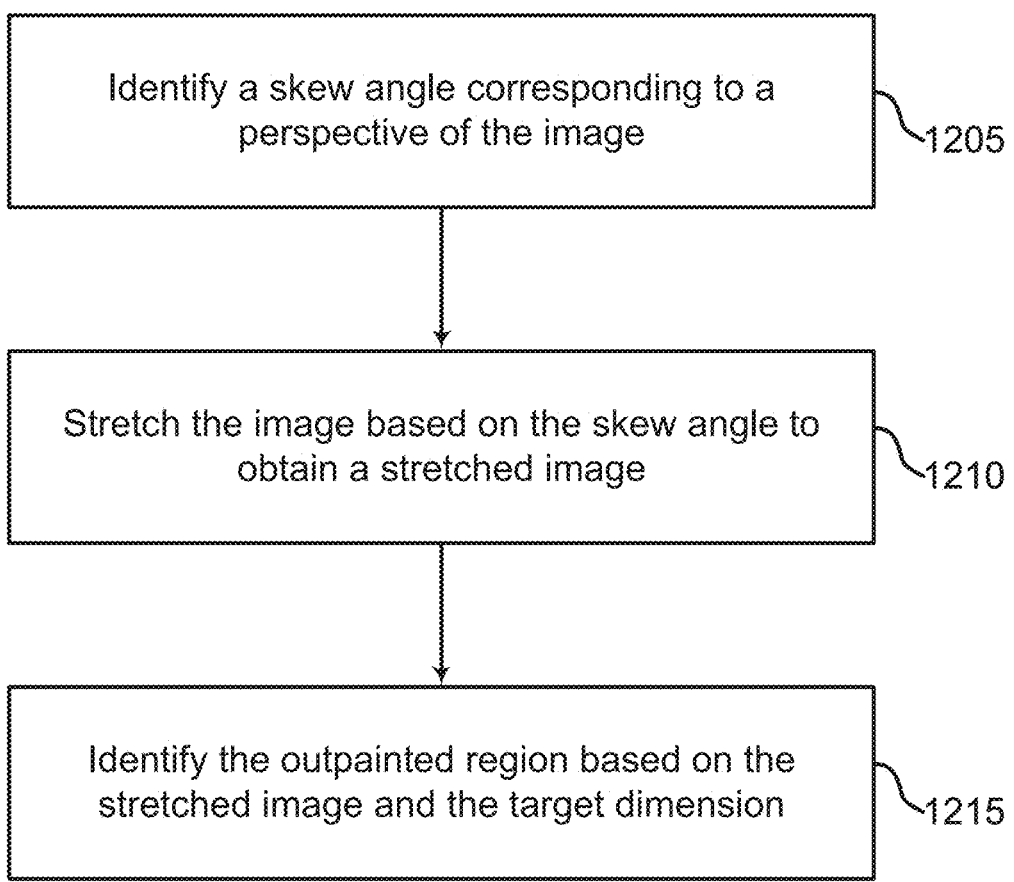
FIG. 12 shows an example of a method for geometry modification according to aspects of the present disclosure.

FIG. 12 shows an example of a method for geometry modification according to aspects of the present disclosure.

In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system identifies a skew angle corresponding to a perspective of the image. In some cases, the operations of this step refer to, or may be performed by, a machine learning model as described with reference to FIG. 2. In some cases, the operations of this step refer to, or may be performed by, a user as described with reference to FIG. 1. The user identifies the skew angle using a guideline via an image cropping interface. The image cropping interface or an image editing application containing the image cropping interface is implemented on an electronic device such as mobile phone. As an example in FIG. 13, the side of the building is not perpendicular to the ground, i.e., has a skew angle in relation to the ground.

At operation 1210, the system stretches the image based on the skew angle to obtain a stretched image. In some cases, the operations of this step refer to, or may be performed by, an image cropping interface as described with reference to FIGS. 2 and 6. In some cases, the user can adjust the skew angle of an object in the image. When the image is stretched, the composition of the image is changed. Referring to FIG. 13, a user wants to "straight up" the building such that the side of the building is perpendicular to the ground via guideline. After stretching, content or pixel may not exist in certain regions of the stretched image.

At operation 1215, the system identifies the outpainted region based on the stretched image and the target dimension. In some cases, the operations of this step refer to, or may be performed by, a machine learning model as described with reference to FIG. 2. The user is interested in filling in details with regards to the outpainted region using the machine learning model.

Figure 13:
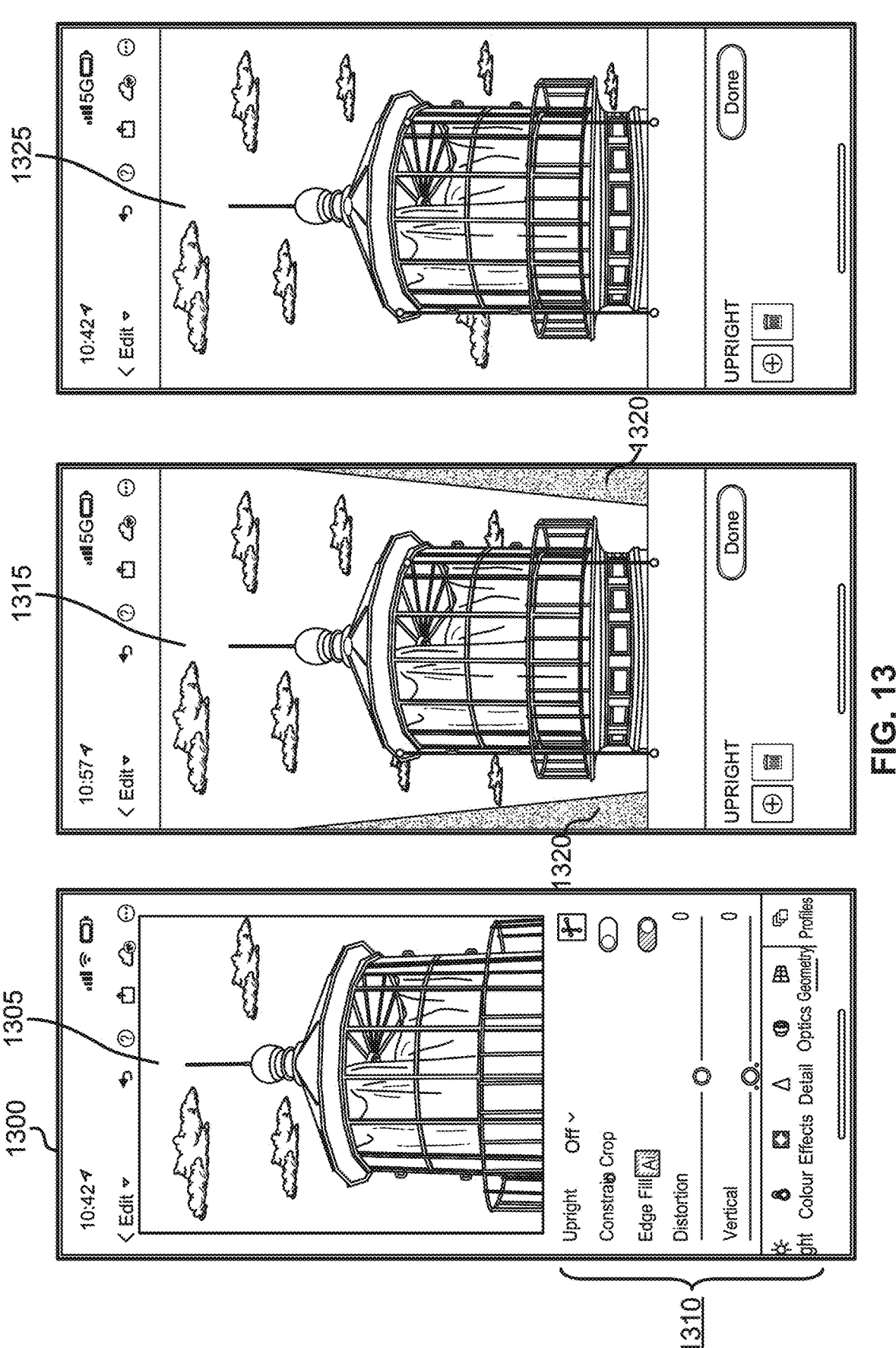
FIG. 13 shows an example of geometry modification of an image according to aspects of the present disclosure.

FIG. 13 shows an example of geometry modification of an image according to aspects of the present disclosure. The example shown includes user interface 1300, image 1305, interface element(s) 1310, stretched image 1315, outpainted region 1320, and expanded image 1325.

Referring to FIG. 13, a user uploads image 1305 to the image processing apparatus via user interface 1300. User interface 1300 or an image editing application containing user interface 1300 is implemented on an electronic device such as mobile phone. As an example, image 1305 includes a distorted building. The building object has a wide bottom and a narrow top. The user wants to modify the geometry of the building object by making it look straight up. User interface 1300 shows a set of interface elements 1310. For example, a user selects a guideline along the two side surfaces of the building and make the two guidelines vertical lines. In response, user interface 1300 identifies a skew angle and stretches image 1305 based on the skew angle to obtain stretched image 1315. When image 1305 is stretched, pixels or content may not exist in certain regions of stretched image 1315. These "missing regions" or "blank regions" may be referred to as outpainted region 1320.

The image processing apparatus infers a prompt based on stretched image 1315 (or image 1305) and generates additional content for outpainted region 1320 based on the prompt. The target dimension of expanded image 1325 may be the same as a dimension of image 1305.

Image 1305 is an example of, or includes aspects of, the corresponding element described with reference to FIGS. 6, 7, and 11. Interface element 1310 is an example of, or includes aspects of, the corresponding element described with reference to FIGS. 6 and 8. Outpainted region 1320 is an example of, or includes aspects of, the corresponding element described with reference to FIG. 7. Expanded image 1325 is an example of, or includes aspects of, the corresponding element described with reference to FIGS. 8 and 11.

Training and Evaluation

Figure 14:
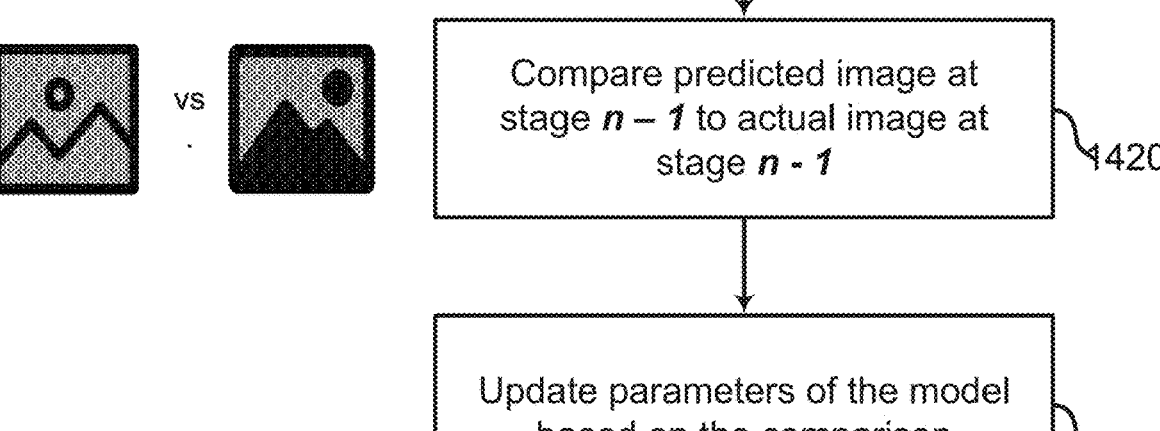
FIG. 14 shows an example of a method for training a diffusion model according to aspects of the present disclosure.
Figure 15:
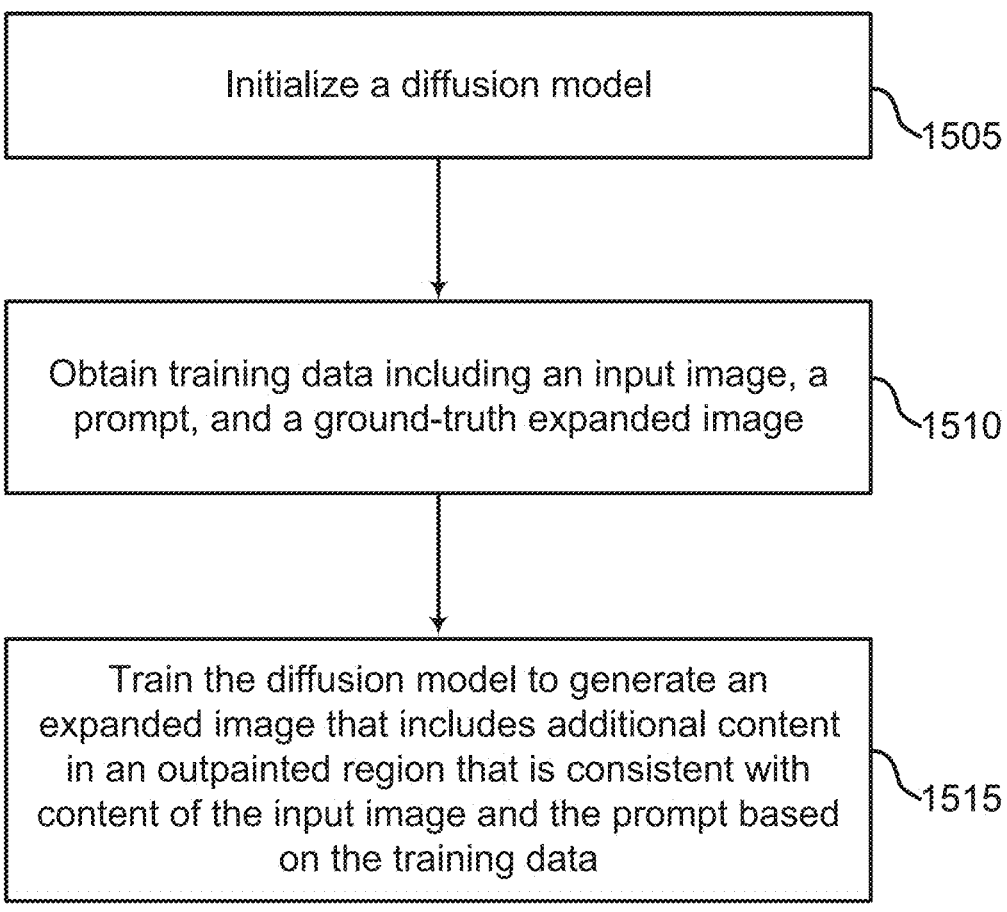
FIG. 15 shows an example of a method for training a machine learning model according to aspects of the present disclosure.

In FIGS. 14-15, a method, apparatus, and non-transitory computer readable medium for image processing are described. One or more aspects of the method, apparatus, and non-transitory computer readable medium include initializing a diffusion model; obtaining training data including an input image, a prompt, and a ground-truth expanded image; and training the diffusion model to generate an expanded image that includes additional content in an outpainted region that is consistent with content of the input image and the prompt based on the training data.

In some embodiments, the training data includes metadata of the input image, and wherein the diffusion model is trained to generate the expanded image based on the metadata. Some examples of the method, apparatus, and non-transitory computer readable medium further include generating the prompt based on the input image and metadata.

Some examples of the method, apparatus, and non-transitory computer readable medium further include cropping the ground-truth expanded image to obtain the input image. Some examples of the method, apparatus, and non-transitory computer readable medium further include initializing a prompt generation network. Some examples further include training the prompt generation network to generate the prompt based on the input image.

In some embodiments, the prompt generation network is trained to generate the prompt based on metadata of the input image. Some examples of the method, apparatus, and non-transitory computer readable medium further include performing a forward diffusion process to obtain a plurality of noise maps. Some examples further include performing a reverse diffusion process using the diffusion model to obtain a plurality of predicted noise maps, wherein the training is based on the plurality of noise maps and the plurality of predicted noise maps.

Some examples of the apparatus and method further include training the prompt generation network to generate the prompt. Some examples further include training the diffusion model to generate the expanded image.

FIG. 14 shows an example of a method for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the user initializes an untrained model. Initialization can include defining the architecture of the model and establishing initial values for the model parameters. In some cases, the initialization can include defining hyper-parameters such as the number of layers, the resolution and channels of each layer block, the location of skip connections, and the like. In some cases, the operations of this step refer to, or may be performed by, a training component as described with reference to FIG. 2.

At operation 1410, the system adds noise to a training image using a forward diffusion process in N stages. In some cases, the forward diffusion process is a fixed process where Gaussian noise is successively added to an image. In latent diffusion models, the Gaussian noise may be successively added to features in a latent space. In some cases, the operations of this step refer to, or may be performed by, a training component as described with reference to FIG. 2.

At operation 1415, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process. In some cases, the operations of this step refer to, or may be performed by, a training component as described with reference to FIG. 2.

At operation 1420, the system compares the predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data. In some cases, the operations of this step refer to, or may be performed by, a training component as described with reference to FIG. 2.

At operation 1425, the system updates parameters of the model based on the comparison. For example, parameters of a U-Net may be updated using gradient descent. Time-dependent parameters of the Gaussian transitions can also be learned. In some cases, the operations of this step refer to, or may be performed by, a training component as described with reference to FIG. 2.

FIG. 15 shows an example of a method for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system initializes a diffusion model. In some cases, the operations of this step refer to, or may be performed by, a training component as described with reference to FIG. 2. Initialization can include defining the architecture of the model and establishing initial values for the model parameters. In some cases, the initialization can include defining hyper-parameters such as the number of layers, the resolution and channels of each layer block, the location of skip connections, and the like. In some cases, the operations of this step refer to, or may be performed by, a training component as described with reference to FIG. 2.

At operation 1510, the system obtains training data including an input image, a prompt, and a ground-truth expanded image. In some cases, the operations of this step refer to, or may be performed by, a training component as described with reference to FIG. 2. In some examples, an input image depicts a person taking a picture of a cityscape in San Francisco. The prompt of the input image is "a person taking a picture of a cityscape, award winning photo, optical illusion, anamorphic widescreen, photograph of San Francisco, built on a steep hill, detailed." Additionally, a ground-truth expanded image is an expanded version of the input image. The ground-truth expanded image includes additional content in one or more outpainted regions compared to the input image. The additional content in the one or more outpainted regions is consistent with content of the input image and the prompt. In some cases, the input image is a cropped image out of the ground-truth expanded image.

At operation 1515, the system trains the diffusion model to generate an expanded image that includes additional content in an outpainted region that is consistent with content of the input image and the prompt based on the training data. In some cases, the operations of this step refer to, or may be performed by, a training component as described with reference to FIG. 2.

According to an embodiment, a prompt generation network is a neural network used to infer a prompt based on an input image. In some cases, the prompt generation network includes a multi-modal encoder such as contrastive language-image pre-training (CLIP) model. The prompt generation network is trained using a variety of (image, text) pairs as training dataset. The training pairs may also be referred to as image-caption pairs. In some cases, the metadata associated with the input image is used to infer the prompt. For example, the metadata associated with the input image is or indicates "Location: San Francisco; Time of day: Sunset; Camera settings: Sony a7 105 mm f4; and Author: Joseph." The diffusion model is trained to generate an expanded image based on the inferred prompt.

Figure 16:
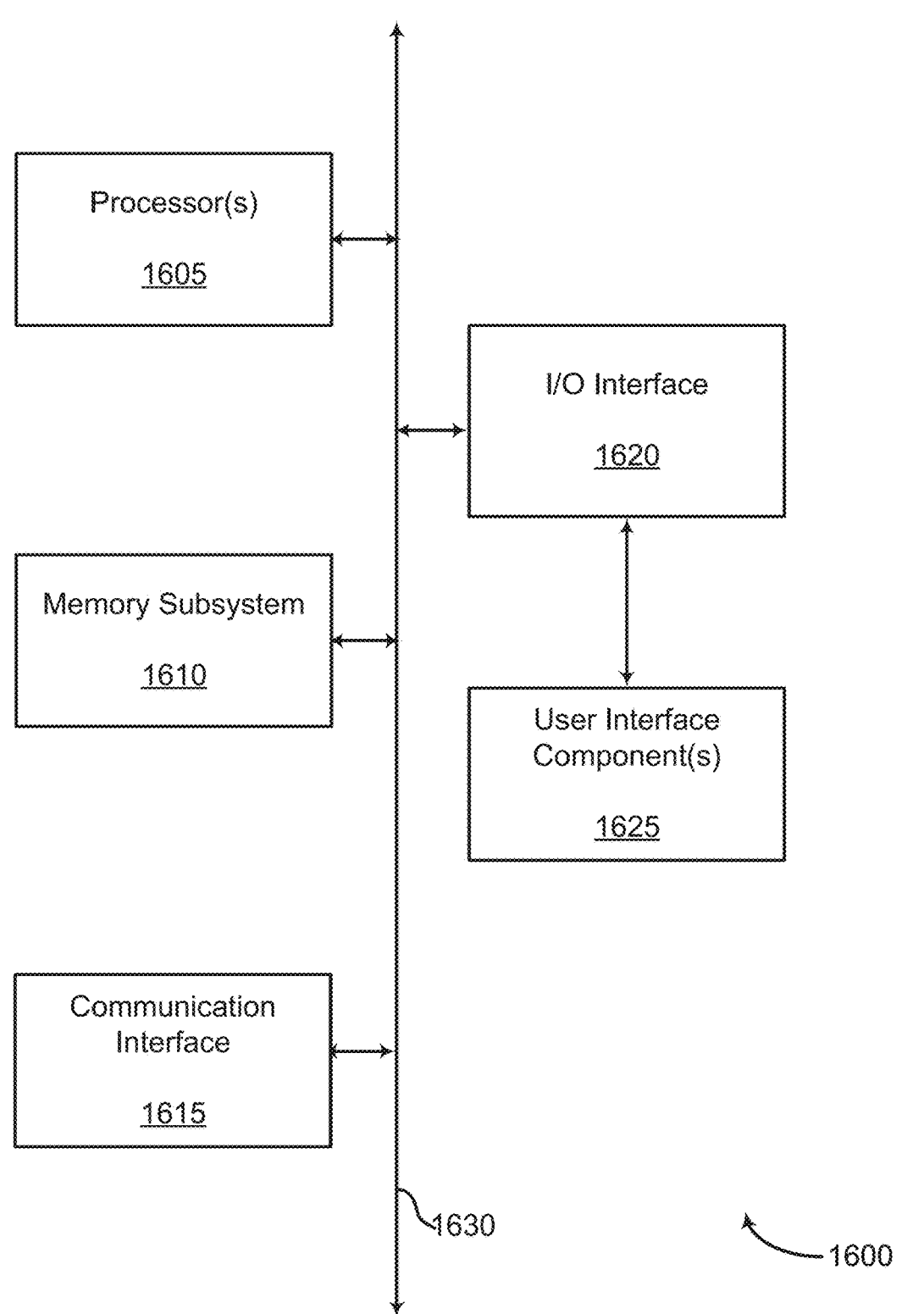
FIG. 16 shows an example of a computing device according to aspects of the present disclosure.

FIG. 16 shows an example of a computing device 1600 according to aspects of the present disclosure. The example shown includes computing device 1600, processor(s) 1605, memory subsystem 1610, communication interface 1615, I/O interface 1620, user interface component(s) 1625, and channel 1630.

In some embodiments, computing device 1600 is an example of, or includes aspects of, the image processing apparatus as described with reference to FIGS. 1-2. In some embodiments, computing device 1600 includes one or more processors 1605 that can execute instructions stored in memory subsystem 1610 to obtain an image and a target dimension for expanding the image; generate a prompt based on the image using a prompt generation network; and generate an expanded image based on the image, the target dimension, and the prompt using a diffusion model, wherein the expanded image includes additional content in an outpainted region that is consistent with content of the image and the prompt.

According to some aspects, computing device 1600 includes one or more processors 1605. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing. Processor 1605 is an example of, or includes aspects of, the processor unit described with reference to FIG. 2.

According to some aspects, memory subsystem 1610 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1610 is an example of, or includes aspects of, the memory unit described with reference to FIG. 2.

According to some aspects, communication interface 1615 operates at a boundary between communicating entities (such as computing device 1600, one or more user devices, a cloud, and one or more databases) and channel 1630 and can record and process communications. In some cases, communication interface 1615 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1620 is controlled by an I/O controller to manage input and output signals for computing device 1600. In some cases, I/O interface 1620 manages peripherals not integrated into computing device 1600. In some cases, I/O interface 1620 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1620 or via hardware components controlled by the I/O controller.

According to some aspects, user interface component(s) 1625 enable a user to interact with computing device 1600. In some cases, user interface component(s) 1625 include an audio device, such as an external speaker system, an external display device such as a display screen, an input device (e.g., a remote-controlled device interfaced with a user interface directly or through the I/O controller), or a combination thereof. In some cases, user interface component(s) 1625 include a GUI.

Performance of apparatus, systems and methods of the present disclosure have been evaluated, and results indicate embodiments of the present disclosure have obtained increased performance over existing technology. Example experiments demonstrate that the image processing apparatus outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining an image and a target dimension from a user, wherein the image includes metadata indicating a camera setting used for capturing the image, and wherein the target dimension indicates an aspect ratio different from the image;
generating a prompt based on the image using a prompt generation network, wherein the prompt includes a term based on the camera setting; and
generating an expanded image based on the image, the target dimension, and the prompt using a diffusion model, wherein the expanded image includes additional content in an outpainted region that is consistent with the term based on the camera setting, and wherein the expanded image has the aspect ratio indicated by the target dimension.

2. The method of claim 1, further comprising:
providing an image cropping interface to the user, wherein the image cropping interface enables the user to increase and decrease a size of the image; and
receiving the target dimension via the image cropping interface.

3. The method of claim 1, further comprising:
identifying an expanded region having the target dimension, wherein the expanded region includes the image and the outpainted region.

4. The method of claim 1, further comprising:
rotating the image to obtain a rotated image; and
identifying the outpainted region based on the rotated image and the target dimension.

5. The method of claim 1, further comprising:
identifying a skew angle corresponding to a perspective of the image;
stretching the image based on the skew angle to obtain a stretched image; and
identifying the outpainted region based on the stretched image and the target dimension.

6. The method of claim 1, further comprising:
identifying the metadata of the image, wherein the prompt is generated based on the metadata.

7. The method of claim 6, wherein:

the metadata comprises time information, location information, color information, or a combination thereof.

8. The method of claim 1, further comprising:

generating an input map for the diffusion model that includes the image in an internal region and noise in the outpainted region, wherein the expanded image is generated based on the input map.

9. The method of claim 1, further comprising:

generating a plurality of low-resolution images depicting a plurality of candidate dimensions for the expanded image; and receiving a user input selecting one of the plurality of candidate dimensions as the target dimension.

10. The method of claim 1, further comprising:

identifying a first region including a first portion of the image and a first portion of the outpainted region;

generating a first tile for the expanded image based on the first region using the diffusion model;

identifying a second region including a second portion of the image and a second portion of the outpainted region; and generating a second tile for the expanded image based on the second region using the diffusion model.

11. The method of claim 10, further comprising:

identifying a first prompt based on the first portion of the image, wherein the first tile is generated based on the first prompt; and identifying a second prompt based on the second portion of the image, wherein the second tile is generated based on the second prompt.

12. A method comprising:

initializing a diffusion model;

obtaining training data including an input image, a prompt, a target dimension, and a ground-truth expanded image, wherein the input image includes metadata indicating a camera setting used for capturing the input image, and wherein the target dimension indicates an aspect ratio different from the input image, and wherein the prompt includes a term based on the camera setting; and training the diffusion model to generate an expanded image that includes additional content in an outpainted region that is consistent with the term based on the camera setting and the training data, wherein the expanded image has the aspect ratio indicated by the target dimension.

13. The method of claim 12, wherein:

the training data includes the metadata of the input image, and wherein the diffusion model is trained to generate the expanded image based on the metadata.

14. The method of claim 12, further comprising:

generating the prompt based on the input image and the metadata.

15. The method of claim 12, further comprising:

cropping the ground-truth expanded image to obtain the input image.

16. The method of claim 12, further comprising:

initializing a prompt generation network; and training the prompt generation network to generate the prompt based on the input image.

17. The method of claim 16, wherein:

the prompt generation network is trained to generate the prompt based on the metadata of the input image.

18. The method of claim 12, further comprising:

performing a forward diffusion process to obtain a plurality of noise maps; and performing a reverse diffusion process using the diffusion model to obtain a plurality of predicted noise maps, wherein the training is based on the plurality of noise maps and the plurality of predicted noise maps.

19. An apparatus comprising:

a processor; and a memory including instructions executable by the processor to:

obtain an image and a target dimension from a user, wherein the image includes metadata indicating a camera setting used for capturing the image, and wherein the target dimension indicates an aspect ratio different from the image;

generate a prompt based on the image using a prompt generation network, wherein the prompt includes a term based on the camera setting; and generate an expanded image based on the image, the target dimension, and the prompt using a diffusion model, wherein the expanded image includes additional content in an outpainted region that is consistent with the term based on the camera setting, and wherein the expanded image has the aspect ratio indicated by the target dimension.

20. The apparatus of claim 19, further comprising instructions executable by the processor to:

train the prompt generation network to generate the prompt; and train the diffusion model to generate the expanded image.

* * * * *